US005917798A

United States Patent [19]

Horimai et al.

[11] Patent Number: 5,917,798

[45] Date of Patent: Jun. 29, 1999

[54] APPARATUS AND METHOD FOR RECORDING AND/OR PLAYING BACK OPTICAL INFORMATION AND MEDIA FOR IT APPARATUS AND METHOD FOR RECORDING AND/OR PLAYING BACK OPTICAL INFORMATION AND MEDIA FOR THEM

[75] Inventors: Hideyoshi Horimai, Kanagawa; Kimihiro Saito, Saitama, both of Japan

[73] Assignee: Sony Corporation, Tokyo, Japan

[21] Appl. No.: 08/915,878

[22] Filed: Aug. 21, 1997

[30] Foreign Application Priority Data

Aug. 30, 1996 [JP] Japan .............................. P08-248861
Apr. 22, 1997 [JP] Japan .............................. P09-104614

[51] Int. Cl.[6] .............................. G11B 7/00

[52] U.S. Cl. .............................. 369/103; 369/110; 369/112

[58] Field of Search .............................. 369/103, 110, 369/112, 119, 100, 44.37, 44.38, 108; 359/113, 119, 215, 216

[56] References Cited

U.S. PATENT DOCUMENTS 5,416,616 5/1995 Jenkins et al. .............................. 369/103 X
5,636,195 6/1997 Saikan et al. .............................. 369/103 X

*Primary Examiner*—Muhammad N. Edun
*Attorney, Agent, or Firm*—Limbach & Limbach L.L.P.

[57] ABSTRACT

An optical information recording/playback apparatus having a compact construction of a recording/playback optical system. A light beam emitted from a laser coupler is modulated by a spatial modulator according to difference in the polarizing direction. The modulated light enters an S-polarized light hologram which separates an information light and a recording reference light of different polarizing directions and having different focal positions. An optical rotation is effected by a split optical rotation plate such that the polarizing directions of the information light and the recording reference light coincide with each other in a region of a holographic layer of a recording medium where the information light and the recording reference light are superposed on each other. The light beam having undergone the optical rotation is applied to the holographic layer through an objective lens, whereby the information carried by the information light is recorded in the holographic layer in terms of an interference pattern produced as a result of an interference between the information light and the recording reference light.

19 Claims, 29 Drawing Sheets n
3
2
1
101
102
103
100
STACK 1
STACK 2
STACK n
105
106
107
104
θ1
θ2
θ3
θn 10
1
11
PICK UP
DRIVING UNIT
84
81
82
83
SPINDLE SERVO CIRCUIT
86
FOCUS SERVO CIRCUIT
TRACKING SERVO CIRCUIT
87
SLIDE SERVO CIRCUIT
88
TE
FE
85
DETECTING CIRCUIT
RF
89
SIGNAL PROCESSING CIRCUIT
90
CONTROLLER 85
25
26
A1
C1
B1
A2
C2
B2
31
32
33
34
35
36
37
38
39
40
41
42
43
44
45
FE
RF
TE

Figures 23A, 23B:
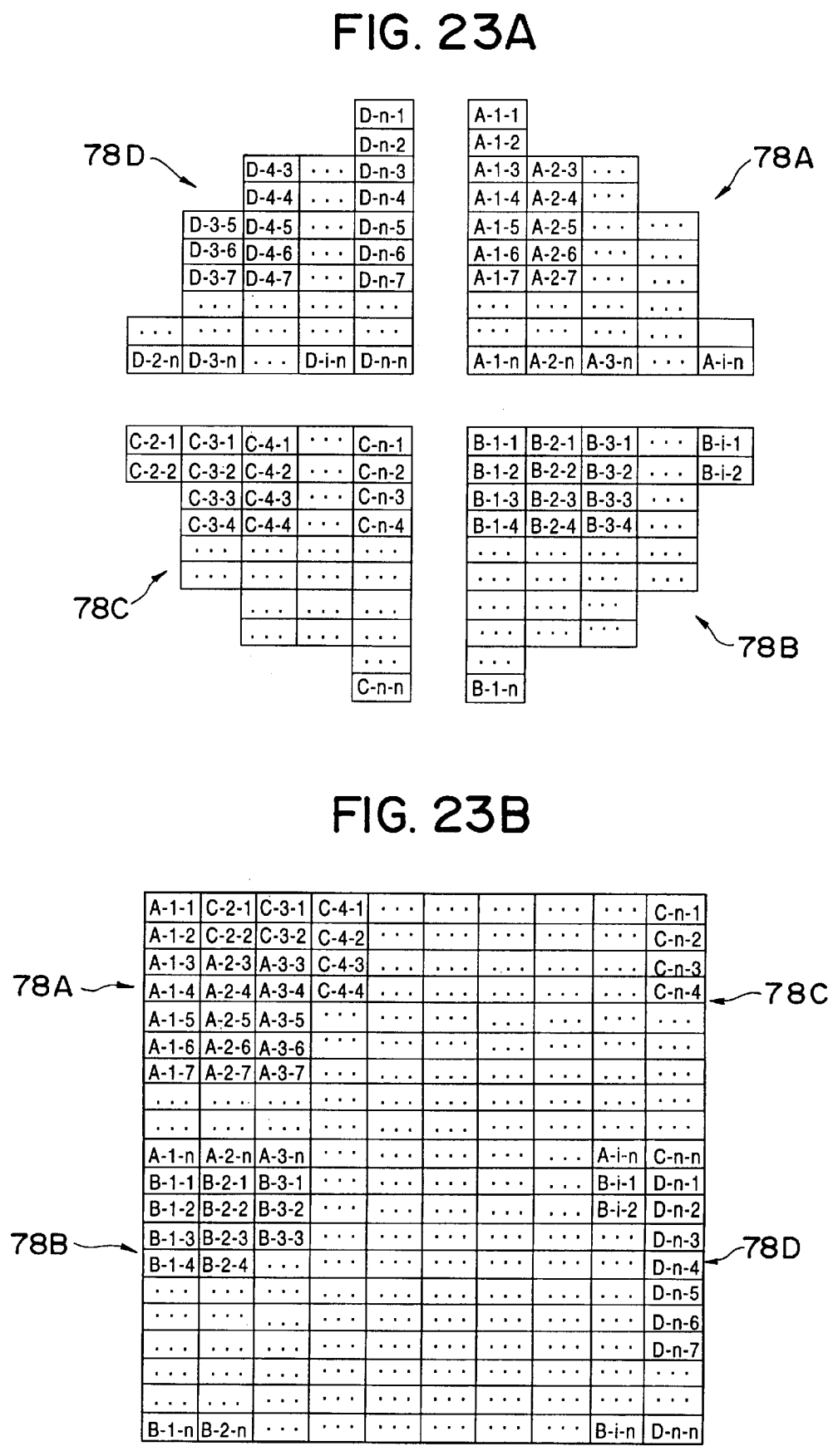

| | | | | |
|---|---|---|---|---|
| | | | | D-n-1 |
| | | | | D-n-2 |
| | | D-4-3 | ... | D-n-3 |
| | | D-4-4 | ... | D-n-4 |
| | D-3-5 | D-4-5 | ... | D-n-5 |
| | D-3-6 | D-4-6 | ... | D-n-6 |
| | D-3-7 | D-4-7 | ... | D-n-7 |
| | ... | ... | ... | ... |
| ... | ... | ... | ... | ... |
| D-2-n | D-3-n | ... | D-i-n | D-n-n |

78A

| | | | | |
|---|---|---|---|---|
| A-1-1 | | | | |
| A-1-2 | | | | |
| A-1-3 | A-2-3 | ... | | |
| A-1-4 | A-2-4 | ... | | |
| A-1-5 | A-2-5 | ... | ... | |
| A-1-6 | A-2-6 | ... | ... | |
| A-1-7 | A-2-7 | ... | ... | |
| ... | ... | ... | ... | |
| ... | ... | ... | ... | |
| A-1-n | A-2-n | A-3-n | ... | A-i-n |

78C

| | | | | |
|---|---|---|---|---|
| C-2-1 | C-3-1 | C-4-1 | ... | C-n-1 |
| C-2-2 | C-3-2 | C-4-2 | ... | C-n-2 |
| | C-3-3 | C-4-3 | ... | C-n-3 |
| | C-3-4 | C-4-4 | ... | C-n-4 |
| | ... | ... | ... | ... |
| | ... | ... | ... | ... |
| | | ... | ... | ... |
| | | ... | ... | ... |
| | | | | ... |
| | | | | C-n-n |

78B

| | | | | |
|---|---|---|---|---|
| B-1-1 | B-2-1 | B-3-1 | ... | B-i-1 |
| B-1-2 | B-2-2 | B-3-2 | ... | B-i-2 |
| B-1-3 | B-2-3 | B-3-3 | ... | |
| B-1-4 | B-2-4 | B-3-4 | ... | |
| ... | ... | ... | ... | |
| ... | ... | ... | ... | |
| ... | ... | ... | | |
| ... | ... | ... | | |
| ... | | | | |
| B-1-n | | | | |

FIG. 23B 78A 78B 78C 78D

| | | | | | | | | | |
|---|---|---|---|---|---|---|---|---|---|
| A-1-1 | C-2-1 | C-3-1 | C-4-1 | ... | ... | ... | ... | ... | C-n-1 |
| A-1-2 | C-2-2 | C-3-2 | C-4-2 | ... | ... | ... | ... | ... | C-n-2 |
| A-1-3 | A-2-3 | A-3-3 | C-4-3 | ... | ... | ... | ... | ... | C-n-3 |
| A-1-4 | A-2-4 | A-3-4 | C-4-4 | ... | ... | ... | ... | ... | C-n-4 |
| A-1-5 | A-2-5 | A-3-5 | ... | ... | ... | ... | ... | ... | ... |
| A-1-6 | A-2-6 | A-3-6 | ... | ... | ... | ... | ... | ... | ... |
| A-1-7 | A-2-7 | A-3-7 | ... | ... | ... | ... | ... | ... | ... |
| ... | ... | ... | ... | ... | ... | ... | ... | ... | ... |
| ... | ... | ... | ... | ... | ... | ... | ... | ... | ... |
| A-1-n | A-2-n | A-3-n | ... | ... | ... | ... | ... | A-i-n | C-n-n |
| B-1-1 | B-2-1 | B-3-1 | ... | ... | ... | ... | ... | B-i-1 | D-n-1 |
| B-1-2 | B-2-2 | B-3-2 | ... | ... | ... | ... | ... | B-i-2 | D-n-2 |
| B-1-3 | B-2-3 | B-3-3 | ... | ... | ... | ... | ... | ... | D-n-3 |
| B-1-4 | B-2-4 | ... | ... | ... | ... | ... | ... | ... | D-n-4 |
| ... | ... | ... | ... | ... | ... | ... | ... | ... | D-n-5 |
| ... | ... | ... | ... | ... | ... | ... | ... | ... | D-n-6 |
| ... | ... | ... | ... | ... | ... | ... | ... | ... | D-n-7 |
| ... | ... | ... | ... | ... | ... | ... | ... | ... | ... |
| ... | ... | ... | ... | ... | ... | ... | ... | ... | ... |
| B-1-n | B-2-n | ... | ... | ... | ... | ... | ... | B-i-n | D-n-n |

ON/OFF
0°/-45°
14R
OFF/ON
+90°/0°
ON/OFF
0°/+45°

APPARATUS AND METHOD FOR RECORDING AND/OR PLAYING BACK OPTICAL INFORMATION AND MEDIA FOR IT APPARATUS AND METHOD FOR RECORDING AND/OR PLAYING BACK OPTICAL INFORMATION AND MEDIA FOR THEM

BACKGROUND OF THE INVENTION

1. Field of the Invention

The present invention relates to an optical information recording apparatus, as well as a method, for recording information in an optical information recording medium by using holography. The present invention also relates to an optical information playback apparatus, as well as a method, for reproducing or playing back information from an optical information recording medium by using holography. The present invention further pertains to optical information media suitable for use in the optical information recording apparatus and the method, as well as in the optical information playback apparatus and method of the present invention.

2. Description of the Related Art

In general, holographic recording technique for recording information in a recording medium by holography employs generation of interference fringes inside the recording medium by superposition of information light carrying image information and reference light so that the information is recorded in the form of the interference fringes. For the purpose of playing back, reference light is applied to the recording medium so as to be diffracted by the interference fringes, whereby the image information is reproduced in the form of the diffracted light.

In recent years, volume holography, in particular digital volume holography, has been developed to a practically usable extent in order to cope with demands for super-high density of optical recording, and is now attracting attention of the field concerned. Briefly, volume holography is a technique in which interference fringes are written three-dimensionally in a recording medium, through a positive use of the medium material in the thicknesswise direction of the same. According to this technique, it is possible to enhance the efficiency of diffraction by increasing the medium thickness, so that a greater storage capacity can be obtained through multiplex recording. Specifically, the above-mentioned digital volume holography is a technique which basically relies upon the volume holography stated above but deals with only digital patterns formed by binary-coded image information. Thus, the digital volume holography is a technique which is friendly to computer technologies. According to digital volume holography, any analog image information such as a picture is digitized and developed into two-dimensional digital patterns which are then recorded as the image information. Reproduction of the image information is conducted by reading and decoding the recorded digital pattern. It is possible to reproduce the original information with a high degree of fidelity despite any inferior SN (sound to noise) ratio during the playback, by the use of suitable technique such as differentiation detection and error correction through coding of the binary-coded data.

FIG. 1 is a schematic perspective view of a recording/playback system employed in a known digital volume holographic apparatus. This recording/playback system has a spatial optical modulator 101 which produces information light based on two-dimensional digital pattern information, a lens 103 which condenses the information light 102 and applies the condensed information light 102 onto a holographic recording medium 100, a reference light applying means (not shown) which applies reference light 104 to the holographic recording medium 100 in a direction substantially perpendicular to the information light 102, a CCD (Charge-coupled device) array 107 for detecting the reproduced two-dimensional digital pattern information, and a lens 106 which condenses the reproduced light 105 from the holographic recording medium 100 and applies the same onto the CCD array 107.

The operation of the recording/playback system shown in FIG. 1 is as follows. When recording information such as a picture, the system digitizes the original picture information into binary signals of 0 or 1 and two-dimensionally develops these binary signals to form two-dimensional digital pattern information. One batch of the two-dimensional digital pattern information will be referred to as "page data". The spatial optical modulator 101 selects the states of pixels, whether transmissive or non-transmissive, in accordance with page data #1, so as to form spatially-modulated information light 102 which is made to be incident to the holographic recording medium 100 through the lens 103. At the same time, reference light 104 is applied to the holographic recording medium 100 in a direction θ1 substantially perpendicular to the information light 102, so that the information light 102 and the reference light 104 are superposed inside the holographic recording medium 100 to form interference fringes which are recorded in the holographic recording medium 100. In order to achieve high diffraction efficiency, the reference light 104 is deformed into a flat beam by means of, for example, a cylindrical lens so that the interference fringes are recorded not only two-dimensionally but also in the direction of thickness of the holographic recording medium 100. For recording the next page data #2, another reference light 104 is applied in a direction θ2 which is different from the above-mentioned angle θ1 so as to be superposed on the information light 102, thus achieving multiplex recording in the holographic recording medium 100. Similarly, successive page data #3 to #n are recorded to achieve further multiplexing of the recording, through application of the reference light 104 at different angles θ3 to θn. Each of the holograms thus recorded is referred to as a "stack". Thus, the structure shown in FIG. 1 has a plurality of stacks (stack 1, stack 2, . . . , stack m and so forth).

Any desired page data can be played back by applying the reference light 104 to the stack at the same angle as that applied when the page data was recorded. The reference light 104 is selectively diffracted by the interference fringes corresponding to the page data so that reproduced light 105 is produced. The reproduced light 105 is made to be incident to the CCD array 107 through the lens 106, so that two-dimensional pattern of the reproduced light is detected by the CCD array 107. The two-dimensional pattern of the reproduced light is subjected to processing reverse to the recording process by being decoded, whereby the information such as an original picture is played back.

The system shown in FIG. 1 enables multiplex recording of information in one holographic recording medium 100. In order to achieve super-high density of recording, it is important to exactly aim the information light 102 and the reference light 104. It is to be noted, however, the holographic recording medium 100 per se of the system shown in FIG. 1 lacks any means which would enable correct aiming of the light. Thus, the information light 102 and the reference light 104 can be aimed with respect to the holographic recording medium 100 could be achieved only through mechanical means which cannot provide sufficiently high degree of aiming precision. This impairs the removability (degree of ease of shifting the recording medium from one recording/reproducing apparatus to another for recording/playback purpose), and hampers random-accessibility, while making it difficult to achieve high density of the recording.

Another problem encountered by the system shown in FIG. 1 is that the size of the optical system is rendered large due to the fact that the optical axes of the information light 102, reference light 104 and detection light 105 are disposed at different spatial positions.

SUMMARY OF THE INVENTION

In view of the foregoing, it is a first object of the present invention to provide an optical information recording apparatus and method, as well as optical information playback apparatus and method, which permit the optical system to have a smaller size than ever, and also an optical information medium suitable for use in such apparatuses and methods.

It is a second object of the present invention to provide an optical information recording apparatus and method, as well as optical information playback apparatus and method, which offers high aiming precision of the recording or playback light, and also an optical information medium suitable for use in such apparatuses and methods.

To these ends, according to one aspect of the present invention, there is provided an optical information recording apparatus for recording information in an optical information recording medium having an information recording layer which is capable of recording information by means of holography, comprising: a light source for emitting a light beam which is to be applied to the optical information recording medium; spatial modulating means for spatially modulating at least part of the light beam from the light source, so as to generate an information light and a recording reference light; and a recording optical system for applying the information light and the recording reference light generated by the spatial modulating means to the information recording layer from the same side of the optical information recording medium, so that the information is recorded in the information recording layer in the form of an interference pattern produced by the interference between the information light and the recording reference light.

The optical information recording medium may have an addressing area storing information for addressing the information light and the reference light. In such a case, apparatus further comprises a position control means for controlling the position of the information light and the recording reference light with respect to the optical information recording medium, based on the information recorded in the addressing area.

The arrangement may be such that the recording optical system applies the information light and the recording reference light such that they are converged at different thicknesswise direction of the optical information recording medium.

In such a case, the spatial modulating means produces spatially modulated light based on the difference in the polarizing direction in accordance with the information to be recorded, thereby generating the information light and the recording reference light having different directions of polarization, while the recording optical system includes: separating means for separating the information light and the recording reference light generated by the spatial modulating means from each other, by differentiating the converging positions according to the polarizing directions; light condensing means for condensing and applying the information light and the recording reference light to the optical information recording layer, in such a manner that one of the information light and the recording reference light passes through the information recording layer in a converging manner while the other passes through the information recording layer in a diverging manner after having once converged; and optical rotating means for setting the polarizing directions of the information light and the recording reference light in opposite directions, for each of two halves of cross-section of the light beam so that the polarizing directions of the information light and the recording reference light coincide with each other in the region in the optical information recording layer where the information light and the recording reference light applied by the light condensing means are superposed to each other.

The optical information recording medium may have a reflective surface provided on the side of the information recording layer opposite to the side from which the information light and the recording reference light enters the information recording layer. When such a medium is used, the spatial modulating means modulates part of the cross-section of the light beam to form the information light while causing the other part of the cross-section to constitute the recording reference light, and the recording optical system applies the information light and the recording reference light to the information recording layer, such that the information light and the recording reference light are converged at the reflective surface so that interference takes place in the information recording layer between the information light prior to reaching the reflective surface and the recording reference light reflected by the reflective surface, as well as between the recording reference light prior to reaching the reflective surface and the information light reflected by the reflective surface.

In accordance with another aspect of the present invention, there is provided an optical information playback apparatus for playing back information from an optical information recording medium having an information recording layer in which the information has been recorded by holography, comprising: a light source for emitting a light beam to be applied to the optical information recording medium; a playback optical system for generating, from the light beam emitted from the light source, a playback reference light and applying the playback reference light to the information recording layer, the playback optical system also collecting, from the same side of the information recording layer as the side from which the playback reference light is applied, reproduction light which is generated from the information recording layer as a result of the application of the playback reference light; and detecting means for detecting the reproduction light collected by the playback optical system.

In this optical information playback apparatus, the optical information recording medium may have a reflective surface on one side of the information recording layer. In this case, the information has been recorded in the information recording layer in terms of an interference pattern caused by an interference between an information light and a recording reference light which have been applied to the information recording layer from the other side thereof such that the information light and the recording reference light converge at different thicknesswise position of the information recording layer. For the purpose of playing back the information, the playback optical system applies to the information recording layer the playback reference light such that the playback reference light converges at the same thicknesswise position as the recording reference light used in the recording of the information, and collects reproduction light which is generated from the information recording layer as a result of application to the information recording layer of a light which is produced as a result of application of the playback reference light to the information recording layer and then reflected back by the reflective layer.

In this optical information playback apparatus, the optical information recording medium may have an addressing area storing information for addressing the information light and the reference light. In such a case, the apparatus may have position control means for controlling the position of the information light and the recording reference light with respect to the optical information recording medium, based on the information recorded in the addressing area.

The reproduction light may be a light which has been spatially modulated in accordance with the information, while the detecting means may be arranged to detect the pattern of the reproduction light.

The reproduction light may include reference position information indicative of a reference position in the pattern of the reproduction light. In such a case, the apparatus may have reference position determining means for determining the reference position in the pattern of the reproduction light based on the reference position information detected by the detecting means.

In the optical information playback apparatus of the present invention, the playback optical system may include an optical rotating means which changes polarizing direction of two cross-sectional halves of a light beam in different directions so that the two halves of the light beam form reference lights of different polarizing directions, the optical rotating means further changes the polarizing directions of two cross-sectional halves of the reproduction light so that the reproduction light has an identical polarizing direction over its entire cross-section.

The optical information recording medium used in the optical information playback apparatus may have a reflective surface on one side of the information recording layer. In this case, the information has been recorded in the information recording layer by applying, to the information recording layer, an information light constituted by a cross-sectional part of a light beam and a recording reference light constituted by the other cross-sectional part of the light beam such that the information light and the recording reference light converge at the reflective surface so that the information is recorded in terms of interference patterns produced by an interference between the information light prior to reaching the reflective surface and the recording reference light after reflected by the reflective surface and an interference between the recording reference light before reaching the reflective surface and the information light after reflected by the reflective surface. For the purpose of playing back the recorded information, the playback optical system applies to the information recording layer a playback reference light corresponding to the recording reference light.

According to still another aspect of the present invention, there is provided an optical information recording method for recording an optical information recording medium having an information recording layer which is capable of recording information by holography, comprising the steps of: spatially modulating at least part of a light beam emitted from a light source, so as to generate an information light and a recording reference light; and applying the information light and the recording reference light to the information recording layer from the same side of the information recording layer so that information is recorded in the information recording layer in terms of an interference pattern produced by an interference between the information light and the recording reference light.

According to a further aspect of the present invention, there is provided an optical information playback method for playing back information from an optical information recording medium having an information recording layer in which the information has been recorded by holography, comprising the steps of: generating a playback reference light from a light beam emitted from a light source and applying the playback reference light to the information recording layer so that a reproduction light is generated from the information recording layer; collecting the reproduction light from the same side of the information recording layer as the side from which the playback reference light is applied to the information recording layer; and detecting the collected reproduction light.

According to a still further aspect of the present invention, there is provided an optical information recording medium, comprising an information recording layer which is capable of holographically recording information in terms of an interference pattern caused by an interference between an information light and a recording reference light which are applied thereto, and capable of generating, when irradiated with a playback reference light, a reproduction light corresponding to the recorded information and emitting the reproduction light from the same side thereof as the side from which the playback reference light is applied.

The information is recorded in the information recording layer in terms of the interference pattern caused by the interference between the information light and the recording reference light which are applied from an identical side of the information recording layer.

The optical information recording medium may comprise an addressing area storing information for addressing the information light, the recording reference light and the playback reference light.

The optical information recording medium may have a reflective layer on one side of the information recording layer, wherein the information is recorded in the information recording layer in terms of an interference pattern caused by the interference between the information light and the recording reference light which are applied to the information recording layer from the other side of the information recording layer so as to converge at different thicknesswise position of the information recording layer.

The optical information recording medium may have a reflective surface on one side of the information recording layer, wherein the information light constituted by a cross-sectional part of a light beam and the recording reference light constituted by the other cross-sectional part of the light beam are applied to the information recording layer in such a manner that they converge at the reflective surface so that the information is recorded in terms of an interference pattern produced by an interference between the information light prior to reaching the reflective surface and the recording reference light after reflected by the reflective surface and by an interference between the recording reference light prior to reaching the reflective surface and the information light after reflected by the reflective surface.

In the optical information recording apparatus of the present invention, at least part of the light beam emitted from a light source is spatially modulated by the spatial modulating means so that an information light and a recording reference light are generated. The information light and the recording reference light are applied by the recording optical system to the information recording layer from the same side thereof, so that the information is recorded in the information recording layer in the form of an interference pattern generated as a result of an interference between the information light and the recording reference light.

In the optical information playback apparatus of the present invention, a playback optical system generates, from the light beam emitted from the light source, the playback reference light, and the playback reference light is applied to the information recording layer. As a result, a reproduction light is generated from the information recording layer and is collected from the same side of the information recording layer as the side from which the playback reference light is applied. The collected reproduction light is detected by the detecting means.

According to the optical information recording method of the present invention, at least part of the light beam emitted from a light source is spatially modulated so that an information light and a recording reference light are generated. The information light and the recording reference light are applied to the information recording layer from the same side thereof, so that the information is recorded in the information recording layer in the form of an interference pattern generated as a result of an interference between the information light and the recording reference light.

According to the optical information playback method of the invention, the playback reference light generated from the light beam emitted by the light source is applied to the information recording layer. As a result, a reproduction light is generated from the information recording layer and is collected from the same side of the information recording layer as the side from which the playback reference light is applied, and the collected reproduction light is detected.

In the optical information recording medium of the present invention, the information is recorded in the information recording layer in the form of an interference pattern produced as a result of the interference between the information light and the recording reference light. When the playback reference light is applied to the information recording layer in which the information has been recorded in the described manner, a reproduction light corresponding to the recorded information is generated and emitted from the same side of the information recording layer as the side from which the playback reference light is applied.

These and other objects, features and advantages of the present invention will become apparent from the following description of the preferred embodiments taken in conjunction with the accompanying drawings.

BRIEF DESCRIPTION OF THE DRAWINGS

FIGS. 23A and 23B are illustrations of the content determined from a reproduced light pattern detected by the pickup of FIG. 2, and an ECC table corresponding to the data;

DESCRIPTION OF THE PREFERRED EMBODIMENTS

Figure 1:
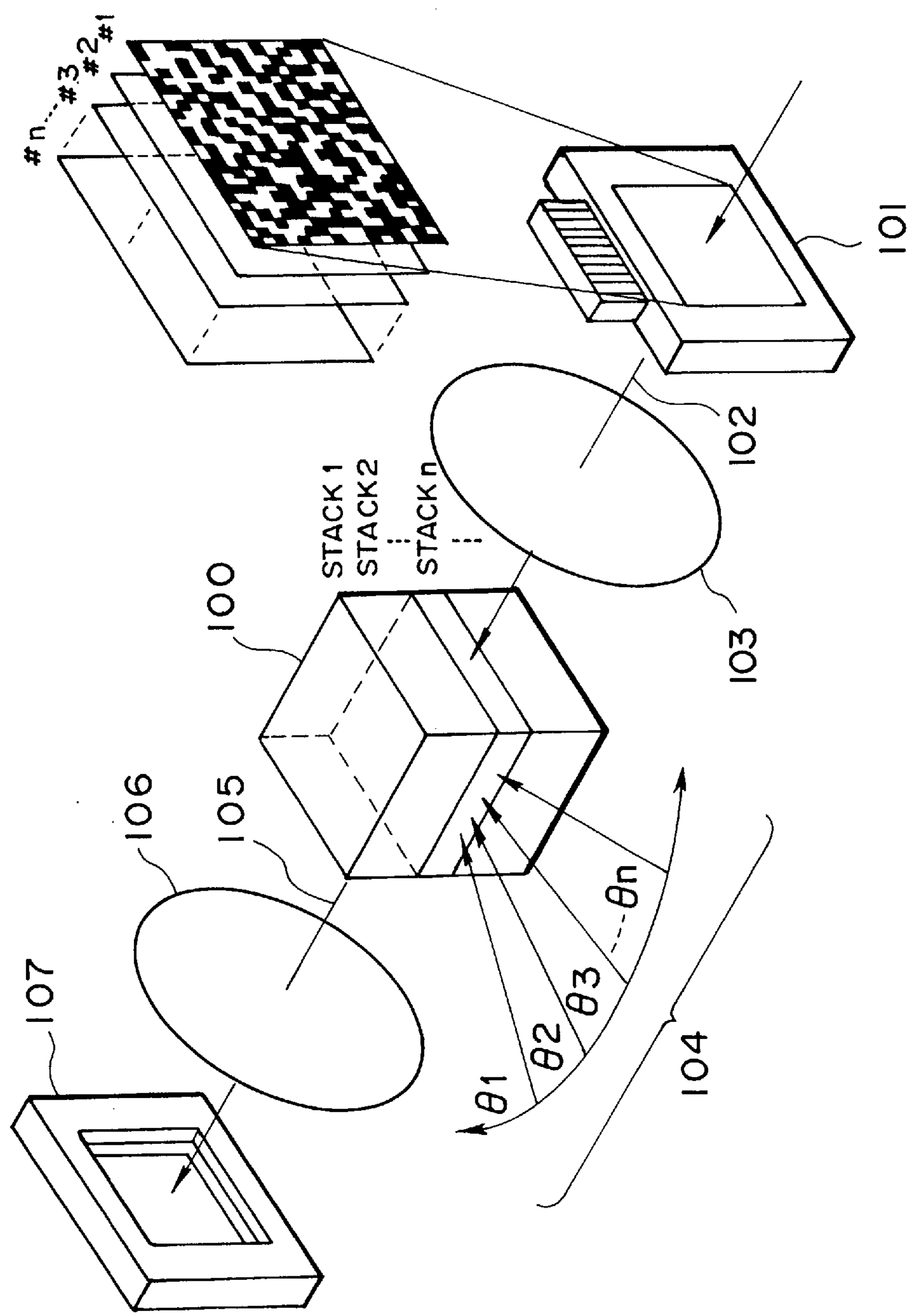
FIG. 1 is a schematic illustration of a recording/playback system for use in an apparatus for recording or playing back optical information by digital volume holographic technique.
Figure 2:
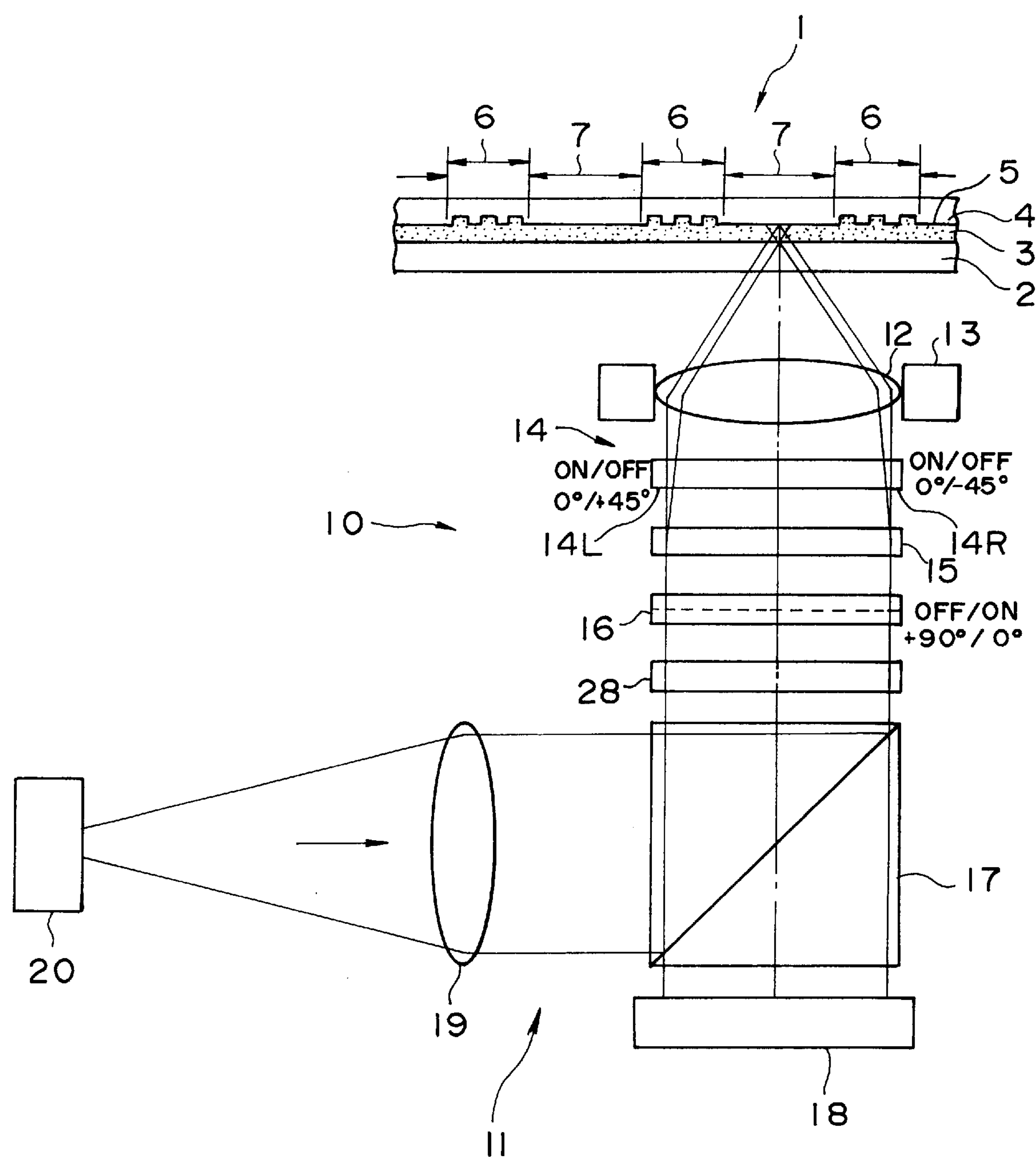
FIG. 2 is an illustration of a pickup incorporated in an optical information recording/playback apparatus in accordance with a first embodiment of the present invention, showing also the construction of an optical information recording medium for use in the apparatus.
Figure 3:
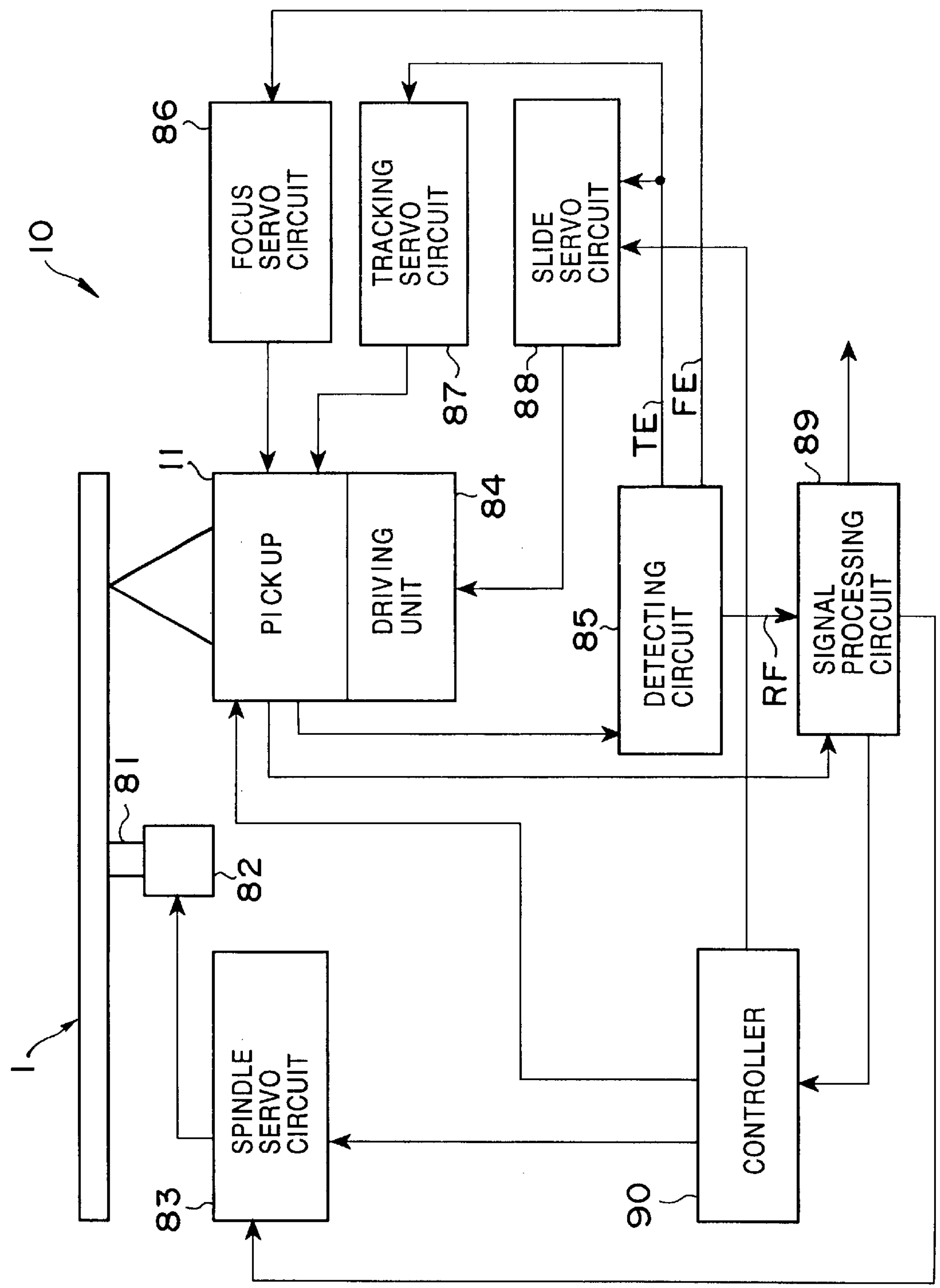
FIG. 3 is a block diagram showing the construction of the whole information recording/playback apparatus of the first embodiment.

Preferred embodiments of the present invention will be described in detail with reference to the accompanying drawings. FIG. 2 shows a pickup incorporated in an optical information recording/playback apparatus implementing first embodiments of the optical information recording apparatus and optical information playback apparatus, as well as a first embodiment of the optical information recording medium of the present invention. FIG. 3 is a block diagram showing the whole construction of the optical information recording/playback apparatus embodying the present invention.

Referring to FIG. 2, the optical information recording medium 1 of the present invention has a disk-shaped transparent substrate 2 made of, for example, polycarbonate. A holographic layer 3 serving as an information recording layer for recording information through volume holography, a reflection layer 5 and a protective layer 4 are laminated in the mentioned order on one side of the optical information recording medium 1. A plurality of radial linear address servo areas 6, which serve as locating regions, are formed at the interface between the holographic layer 3 and the protective layer 4 at a predetermined angular spacing. Each sector sections between adjacent address servo areas 6 serve as a data area 7. Each address/servo area 6 has address information and focusing/tracking servo information which enables focusing and tracking servo control operations in accordance with sampled servo method. The address information and the focusing/tracking servo information are beforehand formed in each address/servo area 6 by means of, for example, emboss pits. The focusing servo control, however, may be performed by using, as a reference, the reflective surface of the reflection layer 5. The tracking servo information may be presented by, for example, wobble pits. The transparent substrate 2 has a suitable thickness, e.g., 0.6 mm or less, while the thickness of the holographic layer 3 may be, for example, 10 μm or greater. The holographic layer 3 is formed of a holographic material which changes its optical characteristics in terms of diffraction index, dielectric constant and reflectivity in accordance with the intensity of light applied thereto. An example of such a holographic material is HRF-600 (trade name) which is a photopolymer produced by Du Pont. The reflection layer 5 is made of, for example, aluminum.

A description will now be given of the construction of the optical information recording/playback apparatus embodying the present invention. As shown in FIG. 3, the optical information recording/playback apparatus 10 has a spindle 81 to which the optical information recording medium 1 is attached, a spindle motor 82 for driving the spindle 81, and a spindle servo circuit 83 for controlling the spindle motor 82. The optical information recording/playback apparatus 10 further has a pickup 11 which applies to the optical information recording medium 1 information light and reference light so as to record information and applies playback reference light to the optical information recording medium 1 to pickup reproduction light to enable reproduction or playback of the information recorded in the optical information recording medium 1. The optical information recording/playback apparatus 10 also has a driving device 84 which drives the pickup 11 radially of the optical information recording medium 1.

The optical information recording/playback apparatus 10 further has the following circuits: a detecting circuit 85 which detects, from the output signal of the pickup 11, a focus error signal, a tracking error signal TE and a reproduction signal RF; a focusing servo circuit 86 which drives an actuator in the pickup 11 so as to move an objective lens in the direction of thickness of the optical information recording medium 1 thereby performing focusing servo control; a tracking servo circuit 87 which drives the actuator in the pickup 11 so as to move the objective lens in the radial direction of the optical information recording medium 1 thereby performing tracking servo control; and a slide servo circuit 88 which controls a driver 84 in accordance with the tracking error signal TE and instructions given by a later-mentioned controller, so as to perform slide servo control.

The optical information recording/playback apparatus 10 further has the following circuits: a signal processing circuit 89 which performs reproduction of data stored in the data area 7 of the optical information recording medium 1 by decoding data output from a later-mentioned CCD array in the pickup 11 and which also performs processings such as reproduction of basic clocks from the reproduction signal RF derived from the detecting circuit 85 and determination of addresses; and the aforementioned controller denoted by 90 which performs overall control of the whole optical information recording/playback apparatus 10. More specifically, the controller 90, upon receipt of the basic clocks and address information derived from the signal processing circuit 89, performs the control of the pickup 11, spindle servo circuit 83 and the slide servo circuit 88. The spindle servo circuit 83 receives the basic clocks output from the signal processing circuit 89.

The detecting circuit 85, focusing servo circuit 86, tracking servo circuit 87 and the slide servo circuit 88 in cooperation constitute position control means, while the signal processing circuit 89 serve as reference position determining means in the apparatus of the present invention.

As will be seen from FIG. 2, the pickup 11 has the following components: an objective lens 12 which opposes the transparent substrate 2 of the optical information recording medium 1 when the latter is fixed to the spindle 81; an actuator 13 which is capable of moving the objective lens 12 in the thicknesswise and radial directions of the optical information recording medium 1; a split optical rotation plate 14, a S-polarized light hologram 15, a spatial optical modulator 16, a P-polarized light hologram 28, a polarizing beam splitter 17 and a CCD array 18 which are arranged in the mentioned order on the opposite side of the objective lens 12 to the optical information recording medium 1; a laser coupler 20 which is disposed at a lateral side of the polarizing beam splitter 17; and a collimator lens 19 interposed between the laser coupler 20 and the polarizing beam splitter 17. The S-polarized light hologram 15 constitutes separating means in the apparatus of the present invention.

The laser coupler 20 emits S-polarized laser light which is collimated into a beam by means of a collimator lens 19. The collimated beam impinges upon the polarizing beam splitter 17 and is reflected by the latter so as to sequentially pass through the P-polarized light hologram 28, spatial optical modulator 16, S-polarized light hologram 15 and the split optical rotation plate 14. The beam is then condensed by the objective lens 12 so as to be incident to the optical information recording medium 1. The light returning from the optical information recording medium 1 sequentially runs through the objective lens 12, split optical rotation plate 14, S-polarized light hologram 15, spatial optical modulator 16 and the P-polarized light hologram 28, so as to be incident to the polarizing beam splitter 17. Only the P-polarized component of the incident light reaches the CCD array 18 through the polarizing beam splitter 17. The S-polarized light is a linear polarized light having a polarizing direction perpendicular to the incident plane (plane of the drawing sheet of FIG. 2), while the P-polarized light is a linear polarized light whose polarization direction is parallel to the incident plane.

The split optical rotation plate 14 has an optical rotation plate 14L and an optical rotation plate 14R which are disposed, respectively, on the left and right sides of the optical axis as viewed in FIG. 2. Each of the optical rotation plate 14L and optical rotation plate 14R is constituted by, for example, a pair of transparent electrode substrates and a liquid crystal layer interposed therebetween. When the optical rotation plate 14L is turned off, i.e., when no voltage is applied between the transparent electrode substrates of the optical rotation plate 14L, the optical rotation plate 14L effects a +45° rotation of the polarizing direction, whereas, when turned on, i.e., when a voltage is applied between the transparent electrode substrates, the optical rotation plate 14L does not cause any rotation of the polarizing direction. In contrast, the optical rotation plate 14R causes −45° rotation of the polarizing direction when it is off, but does not cause rotation when it is on.

The S-polarized light hologram 15 has a lens function which is effective only on the S-polarized light so as to converge the S-polarized light. When the P-polarized light from the spatial optical modulator 16 in the form of the collimated light is received by the S-polarized light hologram 15, the P-polarized light passes through the S-polarized light hologram 15 while keeping the state of collimated light and is condensed by the objective lens 12 so as to be applied to the optical information recording medium 1. The condensed light is converged through the holographic layer 3 so as to minimize its diameter at the interface between the holographic layer 3 and the protective layer 4. In contrast, S-polarized light in the form of collimated light beam, coming from the spatial optical modulator 16 and incident to the S-polarized light hologram 15, is slightly converged by the S-polarized light hologram 15 and is then condensed by the objective lens 12 so as to be incident to the optical information recording medium 1. The beam is converged such that its diameter is minimized at a point which is on the incident side of the interface between the holographic layer 3 and the protective layer 4. The light beam then passes through the holographic layer 3 while diverging. Meanwhile, the P-polarized light hologram 28 has a lens function for converging the light, effective only on the P-polarized light.

The spatial optical modulator 16 has a multiplicity of pixels arranged in the form of a matrix or grating. The arrangement is such that the polarizing direction of the light emitted from each pixel is selectable, so that the light is spatially modulated by the difference in the polarization direction. The spatial optical modulator 16 has, for instance, a construction which is equivalent to a liquid crystal display device relying upon optical rotary power of a liquid crystal device but devoid of polarization plates. Although not exclusive, in this embodiment, the spatial optical modulator 16 is so constructed that each pixel causes a +90° rotation of the polarizing direction when it is off but causes no rotation when it is on.

The liquid crystal used in the spatial optical modulator 16 may be a ferroelectric liquid crystal having a high response speed on the order of microseconds. The use of such a liquid crystal enables high-speed recording. For example, one-page information can be recorded in a period of several microseconds ($\mu$ seconds) or shorter.

Figure 4:
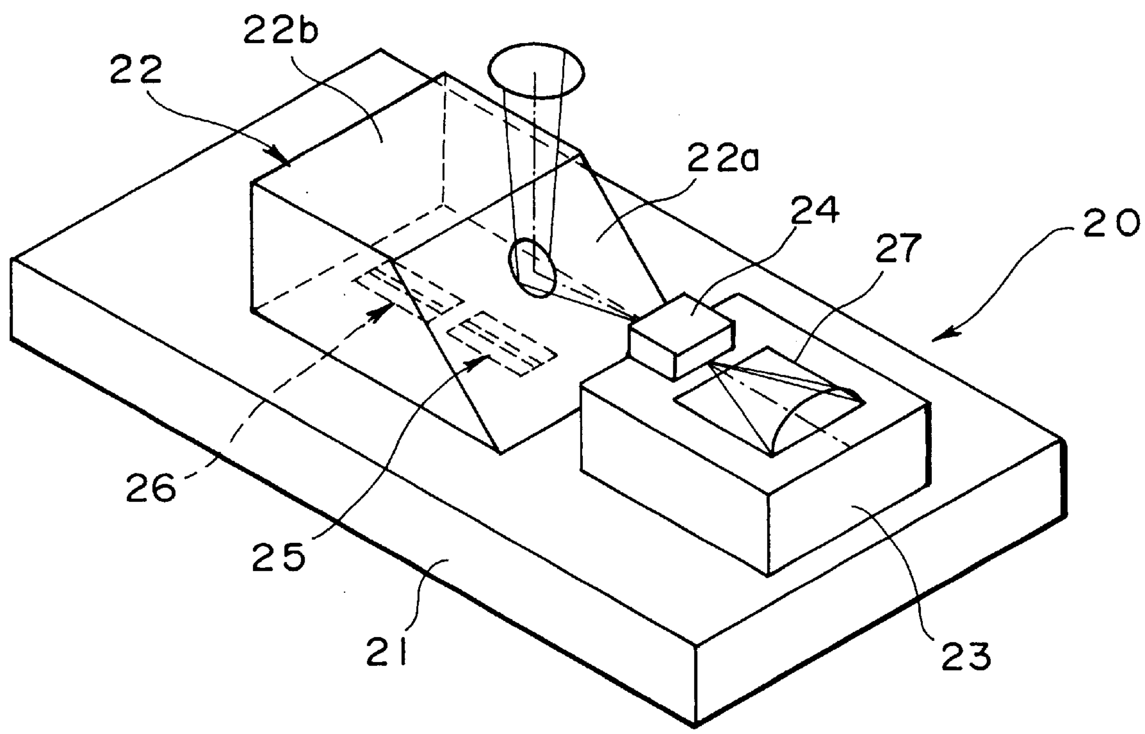
FIG. 4 is a perspective view of a laser coupler shown in FIG. 2.
Figure 5:
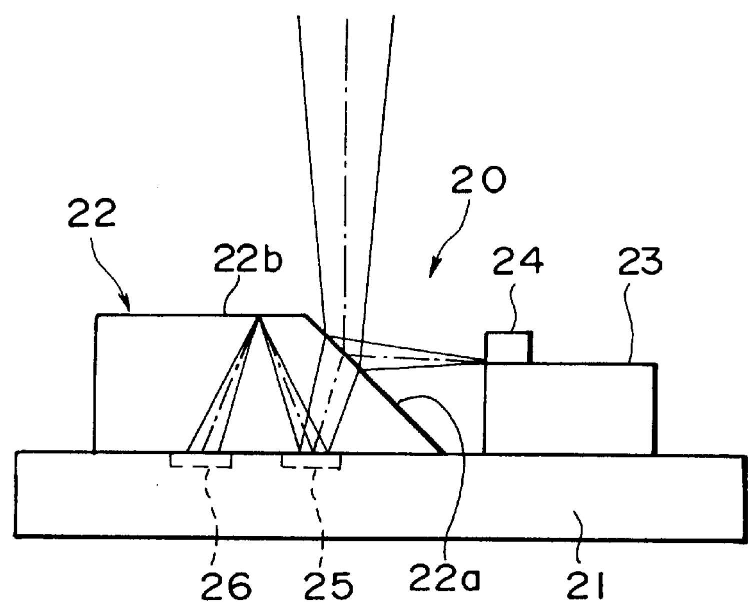
FIG. 5 is a side elevational view of the laser coupler shown in FIG. 2.

FIG. 4 is a perspective view, while FIG. 5 is a side elevational view, of the laser coupler 20 shown in FIG. 2. As will be seen from these Figures, the laser coupler 20 has a semiconductor substrate 21 having photo-detectors 25, 26, a prism 22 covering the photo-detectors 25, 26 and adjoined to the semiconductor substrate 21, a semiconductor device 23 disposed at a position different from those of the photo-detectors 25, 26 and adjoined to the semiconductor substrate 21, and a semiconductor laser 24 adjoined to the semiconductor device 23. The semiconductor laser 24 is capable of emitting a horizontal forward laser beam towards the prism 22 and a backward laser beam in the direction opposite to that of the forward laser beam. The side of the prism 22 adjacent to the semiconductor laser 24 is slanted. The slanted surface constitutes a half-mirror surface **22*a* which reflects part of the forward laser coming from the semiconductor laser 24 and directs the same perpendicularly to the semiconductor substrate 21, while transmitting part of light returning from the optical information recording medium 1. The upper surface of the prism 22 serves as a total reflection surface 22*b* which totally reflects the light passing through the prism 22. The semiconductor device 23 has a photo-detector 27 which receives the rearward laser light coming from the semiconductor laser 24. The photo-detector 27 produces an output signal which is used for the purpose of automatic control of power of the semiconductor laser 24. The semiconductor substrate 21 incorporates various types of amplifiers and other electronic parts. The semiconductor device 23 incorporates various electronic parts including an amplifier for driving the semiconductor laser 24**.

The laser coupler 20 shown in FIGS. 4 and 5 are so constructed that the forward laser light from the semiconductor laser 24 is reflected by the half-mirror surface **22*a* of the prism 22 so as to impinge upon the collimator lens 19 shown in FIG. 2. The light returning from the optical information recording medium 1 and condensed by the collimator lens 19 is partly transmitted through the half-mirror surface 22*a* of the prism 22 so as to run into the prism 22 towards the photo-detector 25. The photo-detector 25 has a half-mirror film, so that part of the light introduced into the prism 22 impinges upon the photo-detector 25 past the half-mirror film on the photo-detector 25. The remainder part of the light introduced into the prism 22 is reflected by the total reflection surface 22*b* of the prism 22 so as to impinge upon the photo-detector 26**.

As will be seen from FIG. 5, the light introduced into the prism 22 is converged such that it once minimizes its diameter at a point intermediate the light path between the photo-detectors 25 and 26. It will be seen also that the diameters of the light incident to the photo-detectors 25 and 26 are equal to each other in an in-focus state in which the diameter of the light beam from the laser coupler 20 is minimized at a point on the interface between the holographic layer 3 and the protective layer 4 of the optical information recording medium 1. Thus, the diameter of the light beam incident to the photo-detector 25 and that of the light beam incident to the photo-detector 26 are different from each other when the optical system is in a de-focus state. The change in the diameter of light beam incident to the photo-detector 25 occurs in the direction opposite to that of the light beam incident to the photo-detector 26, so that a focus-error signal can be obtained by detecting signals indicative of the changes in the diameters of the light beams incident to the photo-detectors 25, 26.

As can be seen from FIG. 4, each of the photo-detectors 25, 26 has a triplet light-receiving areas. More specifically, as will be seen from the Figure, the photo-detector 25 has light-receiving sections A1, C1 and B1, while the photo-detector 26 has light-receiving sections A2, C2 and B2. The light-receiving section C1 is the center one interposed between the sections A1 and B1. Similarly, the light-receiving section C2 is the center section placed between the sections A2 and B2. In each photo-detector, the lines parting adjacent light-receiving sections run in the direction which corresponds to the direction of the tracks on the optical information recording medium 1. It is therefore possible to obtain a tracking error signal, based in the differences between the outputs of the light-receiving sections A1 and B1 and between the outputs of the light-receiving sections A2 and B2, by means of push-pull technique.

A driver circuit (not shown) performs, under the control of the controller 90 shown in FIG. 2, various kinds of control such as the control of output of the semiconductor laser 24 in the laser coupler 20, as well as control of the split optical rotation plate 14 and the control of the spatial optical modulator 16.

Figure 6:
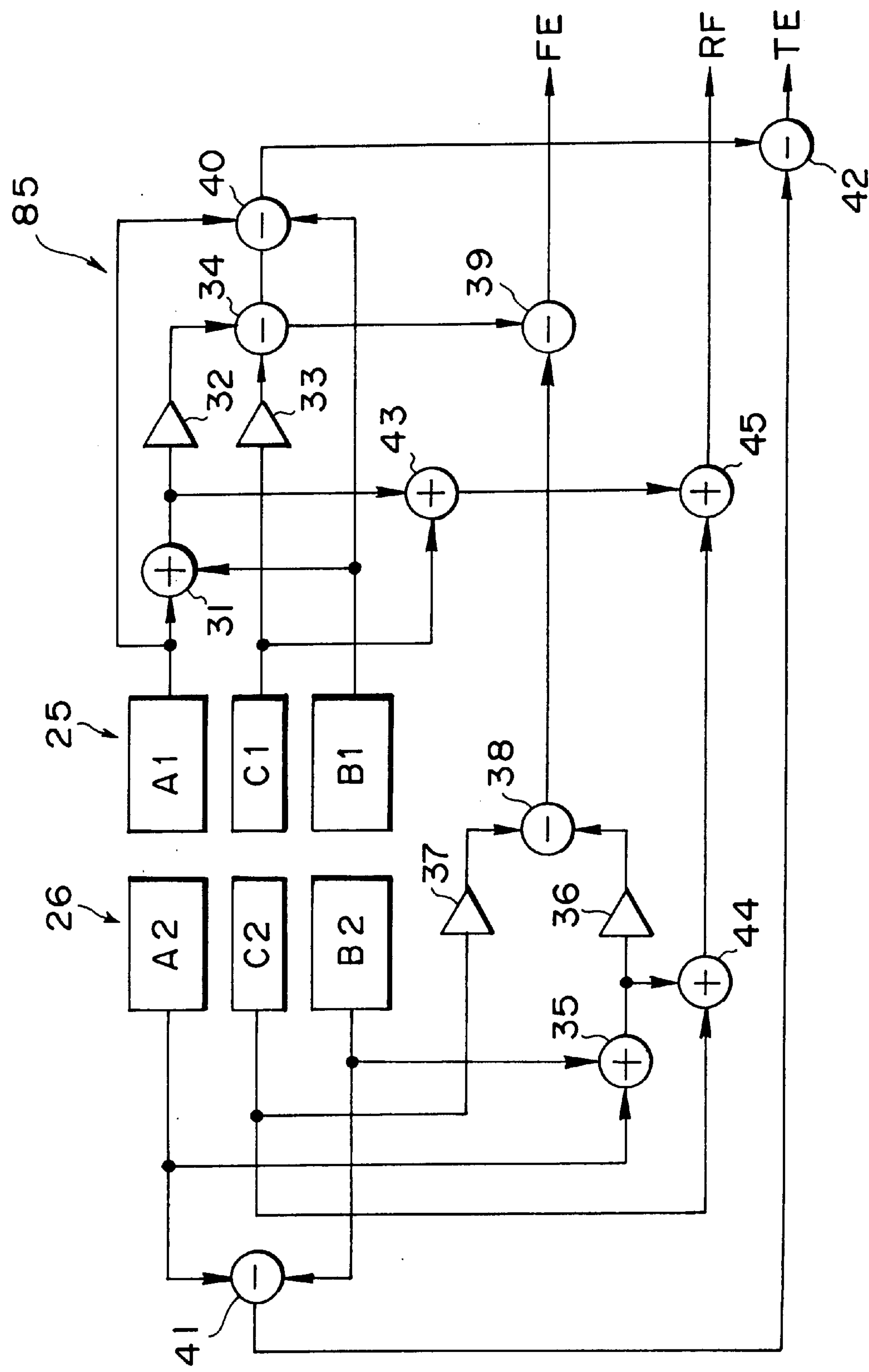
FIG. 6 is a block diagram showing the construction of a detecting circuit.

FIG. 6 is a bock diagram showing the construction of the detecting circuit 85 which detects the focus-error signal and the tracking error signal, As well as reproduced signal, based on the outputs from the photo-detectors 25 and 26. The detecting circuit 85 has the following components: an adder 31 which produces the sum of the outputs from the light-receiving sections A1 and B1 of the photo-detector 25; a gain control amplifier 32 for controlling the gain of the output of the adder 31; a gain control amplifier 33 for controlling the gain of the output from the light-receiving section C1 of the photo-detector 25; a subtracting device 34 for computing the difference between the output of the gain control amplifier 32 and the output of the gain control amplifier 33; an adder 35 which produces the sum of the outputs from the light-receiving sections A2 and B2 of the photo-detector 26; a gain control amplifier 36 for controlling the gain of the output of the adder 35; a gain control amplifier 37 for controlling the gain of the output from the light-receiving section C2 of the photo-detector 26; a subtracting device 38 for computing the difference between the output of the gain control amplifier 36 and the output of the gain control amplifier 37; and a subtracting device 39 which computes the difference between the output of the subtracting device 34 and the output of the subtracting device 38, thereby producing a focus-error signal FE.

The detecting circuit 85 further has the following components: a subtracting device 40 for computing the difference between the output from the light-receiving section A1 and the light-receiving section B1 of the photo-detector 25; a subtracting device 41 for computing the difference between the output from the light-receiving section A2 and the light-receiving section B2 of the photo-detector 26; and a subtracting device 42 which computes the difference between the output of the subtracting device 40 and the output of the subtracting device 41, thereby producing a tracking error signal TE. The detecting circuit 85 further has the following components: an adder 43 for computing the sum of the output of the adder 31 and the output of the light-receiving section C1; an adder 44 for computing the sum of the output of the adder 35 and the output of the light-receiving section C2; and an adder 45 which computes the sum of the outputs from the adders 43 and 44 so as to form a reproduction signal RF. In this embodiment, the reproduction signal RF is the signal which is obtained by reproducing the information recorded in the address/servo area 6 of the optical information recording medium 1.

A description will now be given of the operation of the optical information recording/playback apparatus, as well as the optical information recording medium 1, of the present invention. The description will begin with the servo control operation, followed by description of recording operation which in turn is followed by description of playback operation. In each of these operations, the optical information recording medium 1 is driven by the spindle motor 82 while being controlled to a predetermined constant rotation speed.

Figure 7:
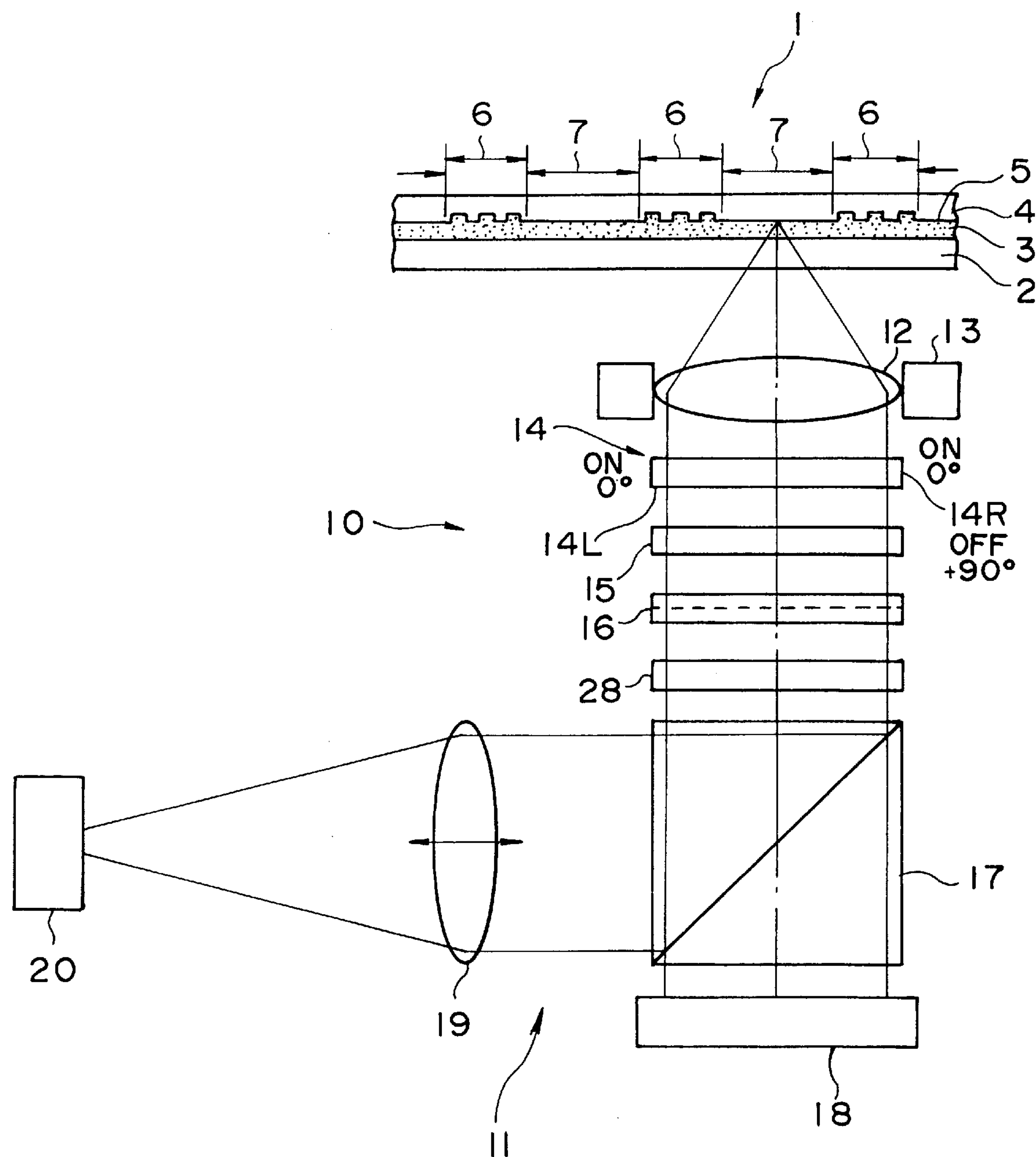
FIG. 7 is an illustration of the pickup shown in FIG. 2 under a servo control.
Figure 9:
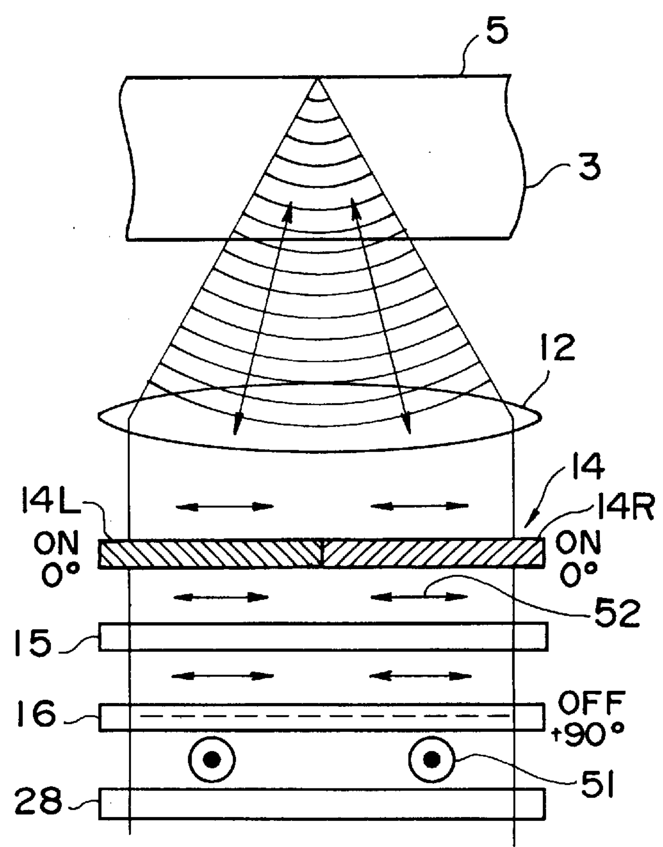
FIG. 9 is an illustration of states of different types of light in the pickup under the state as shown in FIG. 7.

The servo control operation will be described with reference to FIG. 7 which illustrates the state of the pickup 11 during the servo control,and also to FIG. 9 which illustrates the states of light beams. As will be seen from these Figures, all the pixels of the spatial optical modulator 16 are kept off, while the optical rotation plate 14L and optical rotation plate 14R of the split optical rotation plate 14 are kept on, during the servo control. The level of the light output from the laser coupler 20 is set to a low level which is the same level as that used during the playback operation. The controller 90 expects, based on the basic clocks reproduced from the reproduction signal RF, the timing at which the light emitted from the objective lens 12 passes through the address servo area 6, so as to maintain the above-mentioned output power level when the light from the objective lens 12 passes through the address servo area 6.

The S-polarized light emitted rom the laser coupler 20 is collimated into a collimated light beam by means of the collimator lens 19. The collimated light beam is made to be incident to the polarizing beam splitter 17 so as to be reflected by the latter, and passes through the P-polarized light hologram 28 to the spatial optical modulator 16 without being subjected to any influence. Since all of the pixels of the spatial optical modulator 16 have been set to off, the light beam which has passed through the spatial optical modulator 16 has been changed to a P-polarized light as a result of the +90° rotation. In FIG. 9, the S-polarized light and the P-polarized light are respectively denoted by numerals 51 and 52. The P-polarized light having passed through the spatial optical modulator 16 is transmitted through the S-polarized light hologram 15 without undergoing any influence, and impinges upon the split optical rotation plate 14. Since both the optical rotation plate 14L and optical rotation plate 14R of the split optical rotation plate 14 have been turned on, the light beam passes through the split optical rotation plate 14 without any influence. The light beam transmitted through the split optical rotation plate 14 is then condensed by the objective lens 12 and is applied to the optical information recording medium 1 in such a manner that the diameter of the beam is minimized at the interface between the holographic layer 3 and the protective layer 4 of the optical information recording medium 1. The light beam is reflected by the reflective film 5 of the optical information recording medium 1 back to the objective lens 12, after being modulated in accordance with the emboss pits in the address servo area 6. The returning reflected light is collimated by the objective lens 12 and is passed through the split optical rotation plate 14 and the S-polarized light hologram 15 without being affected. The light beam then impinges upon the spatial optical modulator 16 so as to be changed again to a S-polarized light through a rotation effected by the spatial optical modulator 16. The S-polarized light then passes through the P-polarized light hologram 28 without being affected, and is reflected by the polarizing beam splitter 17 to impinge upon the laser coupler 20, so as to be detected by the photo-detectors 25, 26. The detecting circuit 85 shown in FIG. 6 generates the focus-error signal FE, tracking error signal TE and the reproduction signal RF, based on the outputs from the photo-detectors 25 and 26. Focusing servo control and tracking servo control, as well as generation of basic clocks and determination of the address, are performed in accordance with these signals.

The arrangement of the pickup 11 during the servo control operation as described is the same as that of recording or playback pickups for ordinary optical disks such as CD (compact disk), DVD (digital video disk) and HS (hyper storage disk). Therefore, the optical information recording/reproducing apparatus 10 of this embodiment may be constructed so as to be compatible with that for ordinary optical disk apparatuses.

Figure 8:
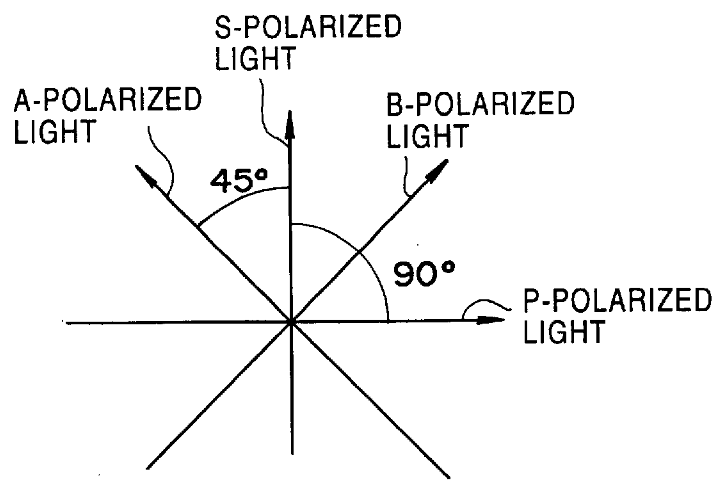
FIG. 8 is an illustration of polarized lights employed in the first embodiment.

Referring now to FIG. 8, an A-polarized light and a B-polarized light are defined, respectively, as a linear polarized light obtained through a −45° rotation of the polarization direction of the S-polarized light or through a +45° rotation of the polarizing direction of the P-polarized light, and a linear polarized light which is obtained through a +45° rotation of the polarization direction of the S-polarized light or through a −45° rotation of the polarizing direction of the P-polarized light. The polarizing directions of the A-polarized light and the B-polarized light are orthogonal to each other.

Figure 10:
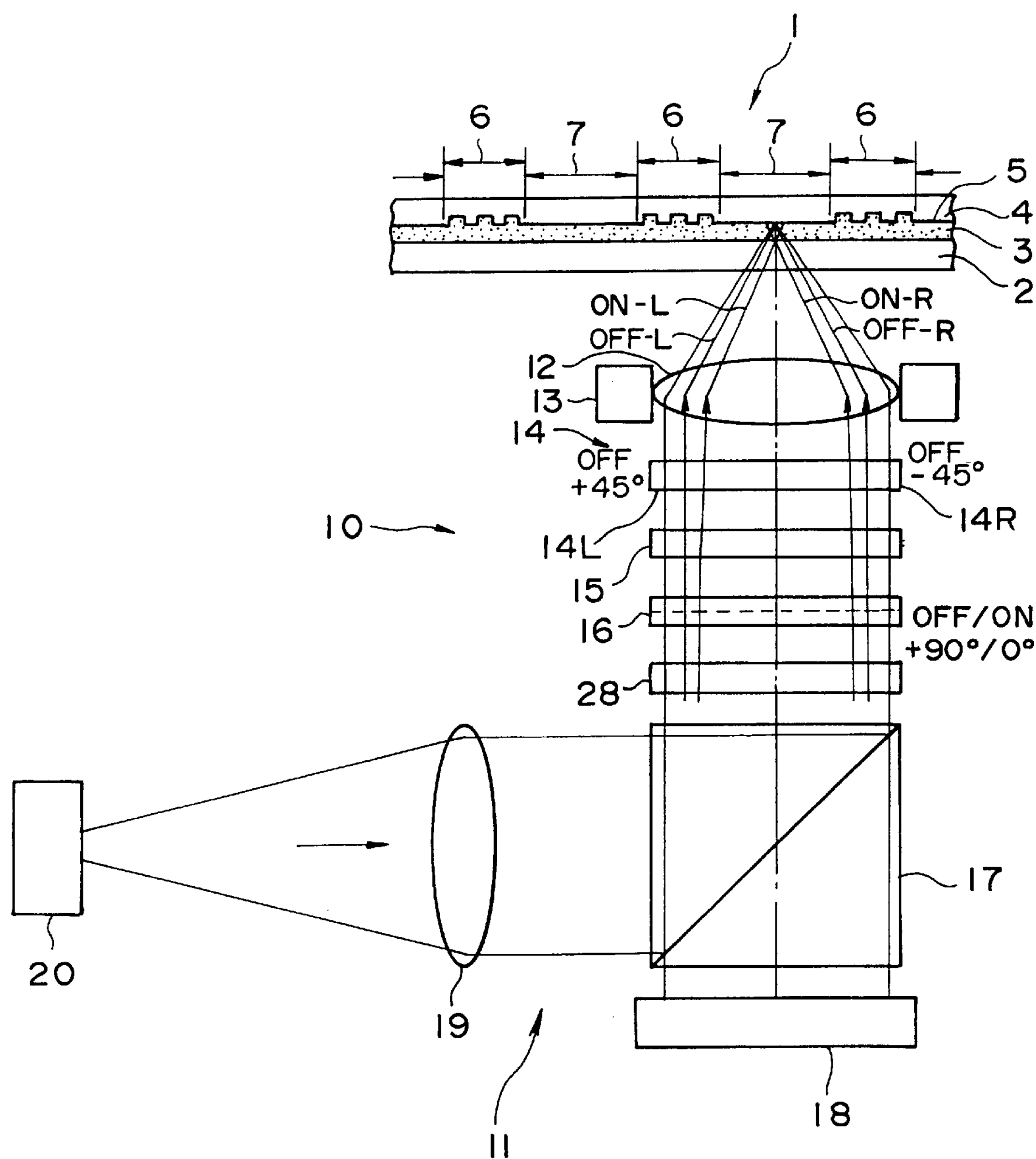
FIG. 10 is an illustration of the pickup of FIG. 2 in a recording operation.
Figure 11:
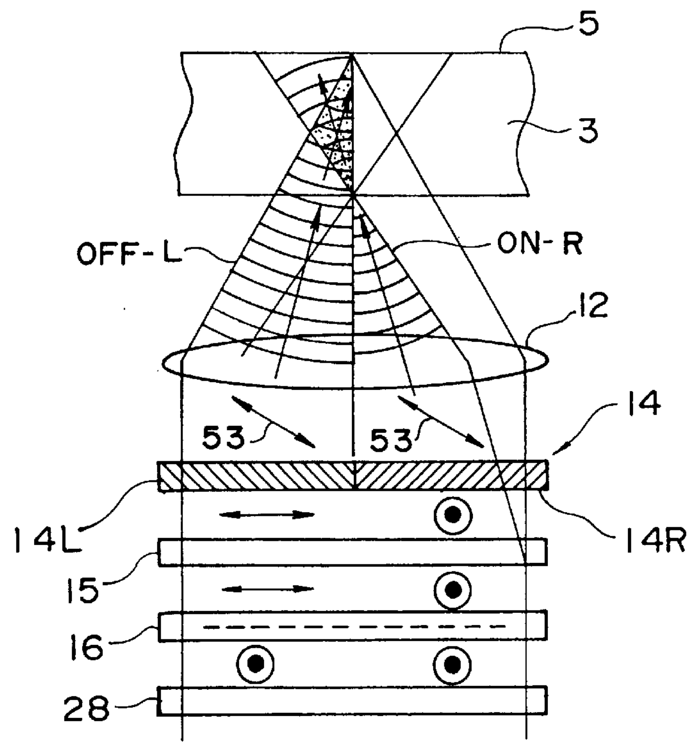
FIG. 11 is an illustration of states of light beams used in the pickup in the recording operation as shown in FIG. 10.
Figure 12:
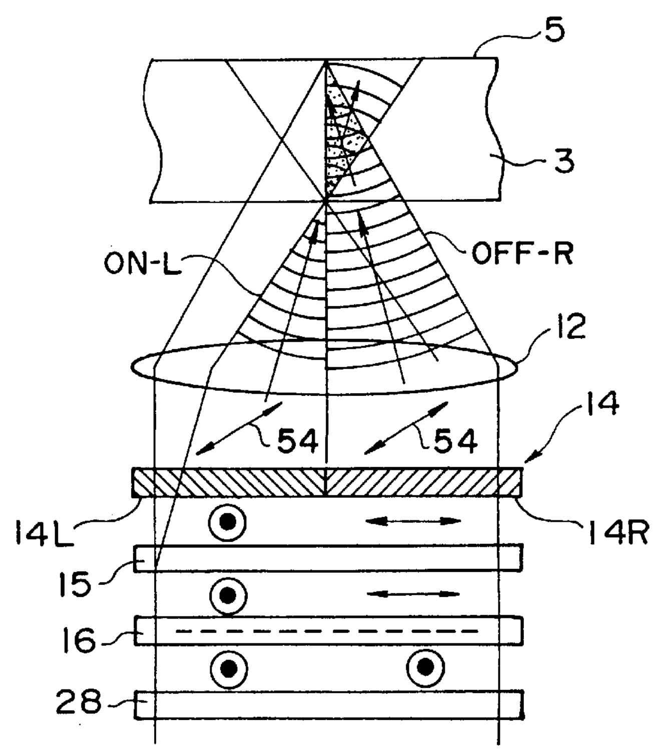
FIG. 12 is another illustration of states of light beams used in the pickup in the recording operation as shown in FIG. 10.

A description will now be given of the recording operation. FIG. 10 is an illustration of the pickup 11 used for recording, while FIGS. 11 and 12 are illustrations of states of light beams during the recording. As will be seen from these Figures, the spatial optical modulator 16 selects one of two states, i.e., on and off, for each of the pixels, in accordance with the information to be recorded. In this embodiment, one-bit information is represented by a couple o pixels. It is essential that one of the two pixels representing one-bit information is on, while the other is off. It is also essential that both the optical rotation plate 14L and the optical rotation plate 14R of the split optical rotation plate 14 are off. The power of the light emitted from the laser coupler 20 is set to a high level suitable for recording. The controller 90 expects the timing at which the light from the objective lens 12 will pass through the data area 7, based on the basic clocks reproduced from the reproduction signal RF, and maintains the conditions set forth above during the period in which the light from the objective lens 12 passes through the data area 7. During this period, the focusing servo control nor the tracking servo control is performed, so that the objective lens 12 is fixed.

The S-polarized light from the laser coupler 20 is collimated through the collimator lens 19 and the collimated beam is made to be incident to the polarizing beam splitter 17 so as to be reflected by the polarizing beam splitter 17. The reflected light beam then passes through the P-polarized light hologram 28 without being affected so as to impinge upon the spatial optical modulator 16. The portion of the light beam passing through the pixels of the spatial optical modulator 16 which have been turned on is emitted therefrom without rotation of polarizing direction. Thus, the portion of the light beam which has passed through these pixels remains to be S-polarized light. The portion of the light beam passing through the pixels of the spatial optical modulator 16 which have been turned off is emitted therefrom with the polarizing direction rotated through +90°. Thus, the portion of the light beam which has passed through these pixels has been changed to P-polarized light. The light beam which has passed through the spatial optical modulator 16 impinges upon the S-polarized light hologram 15 which converges only the S-polarized light. Consequently, the P-polarized light component of the light beam from the spatial optical modulator 16 remains to be a collimated beam and passes through the S-polarized light hologram 15. The P-polarized light component is then condensed by the objective lens 12 and is applied to the optical information recording medium 1 so as to pass the holographic layer 3 while being converged such that the diameter of the beam is minimized at the interface between the holographic layer 3 and the protective layer 4. Meanwhile, the S-polarized light component of the light beam from the spatial optical modulator 16 is slightly converged by the S-polarized light hologram 15 and is then condensed by the objective lens 12 so as to impinge upon the optical information recording medium 1 such that the diameter of this beam is minimized before it reaches the interface between the holographic layer 3 and the protective layer 4. This light beam then passes through the holographic layer 3 while diverging. In this embodiment, the light beam which minimizes its diameter at a point on the interface between the holographic layer 3 and the protective layer 4 is used as a recording reference light, while the light beam which minimizes its diameter before reaching the above-mentioned interface is used as the information light carrying the information to be recorded.

The portion of the light beam from the S-polarized light hologram 15 which is on the left side of the optical axis enters the optical rotation plate 14L of the split optical rotation plate 14 so as to undergo +45° rotation of the polarizing direction, while the portion of the light beam from the S-polarized light hologram 15 which is on the right side of the optical axis enters the optical rotation plate 14R of the split optical rotation plate 14 so as to undergo −45° rotation of the polarizing direction. The light beam which has passes through the "off" pixels of the spatial optical modulator 16 and then through the optical rotation plate 14L is referred to as "reference light OFF-L, while the light beam which has passes through the "on" pixels of the spatial optical modulator 16 and then through the optical rotation plate 14L is referred to as "information light ON-L. Similarly, the light beam which has passes through the "off" pixels of the spatial optical modulator 16 and then through the optical rotation plate 14R is referred to as "reference light OFF-R, while the light beam which has passes through the "on" pixels of the spatial optical modulator 16 and then through the optical rotation plate 14R is referred to as "information light ON-R. As will be seen from FIG. 11, the reference light OFF-L passes through the optical rotation plate 14L so as to become A-polarized light, while the information light ON-R passes through the optical rotation plate 14R so as to become A-polarized light. In FIG. 11, reference numeral 53 denotes A-polarized light. Referring now to FIG. 12, the reference light OFF-R passes through the optical rotation plate 14R so as to become B-polarized light, while the information light ON-L passes through the optical rotation plate 14L so as to become B-polarized light. In FIG. 12, reference numeral 54 denotes B-polarized light. In this embodiment, information is recorded in the holographic layer 3 by using these four types of light beams, in accordance with a method which will now be fully described with reference to FIGS. 11 and 12.

FIG. 11 illustrate the state of interference between the reference light OFF-L and the information light ON-R. As will be seen from this Figure, in the region which is on the left side of the optical axis, the reference light OFF-L passes through the holographic layer 3 while converging, whereas the information light ON-R passes through the holographic layer 3 while diverging. The reference light OFF-L and the information light ON-R interfere with each other, since they are A-polarized light. When the power of the light emitted from the laser coupler 20 is set to high level, the pattern of interference between the reference light OFF-L and the information light ON-R is recorded in the holographic layer 3 in a volumetric manner. The region on the left side of the optical axis also permits the reference light OFF-R after reflection by the reflective film 5 to pass therethrough. The reference light OFF-R, however, does not interfere with the reference light OFF-L and the information light ON-R, because the reference light OFF-R is a B-polarized light which has polarizing direction perpendicular to that of the A-polarized light.

FIG. 12 illustrate the state of interference between the reference light OFF-R and the information light ON-L. As will be seen from this Figure, in the region which is on the right side of the optical axis, the reference light OFF-R passes through the holographic layer 3 while converging, whereas the information light ON-L passes through the holographic layer 3 while diverging. The reference light OFF-R and the information light ON-L interfere with each other, since they are B-polarized light. When the power of the light emitted from the laser coupler 20 is set to high level, the pattern of interference between the reference light OFF-R and the information light ON-L is recorded in the holographic layer 3 in a volumetric manner. The region on the right side of the optical axis also permits the reference light OFF-L after reflection by the reflective film 5 to pass therethrough. The reference light OFF-L, however, does not interfere with the reference light OFF-R and the information light ON-L, because the reference light OFF-L is an A-polarized light which has polarizing direction perpendicular to that of the B-polarized light.

Thus, in this embodiment, the polarizing direction of the interfering light beams at the left side of the optical axis is orthogonal to that at the right side of the optical axis, whereby generation of useless interference fringes is avoided to prevent reduction of the SN ratio.

Figure 13:
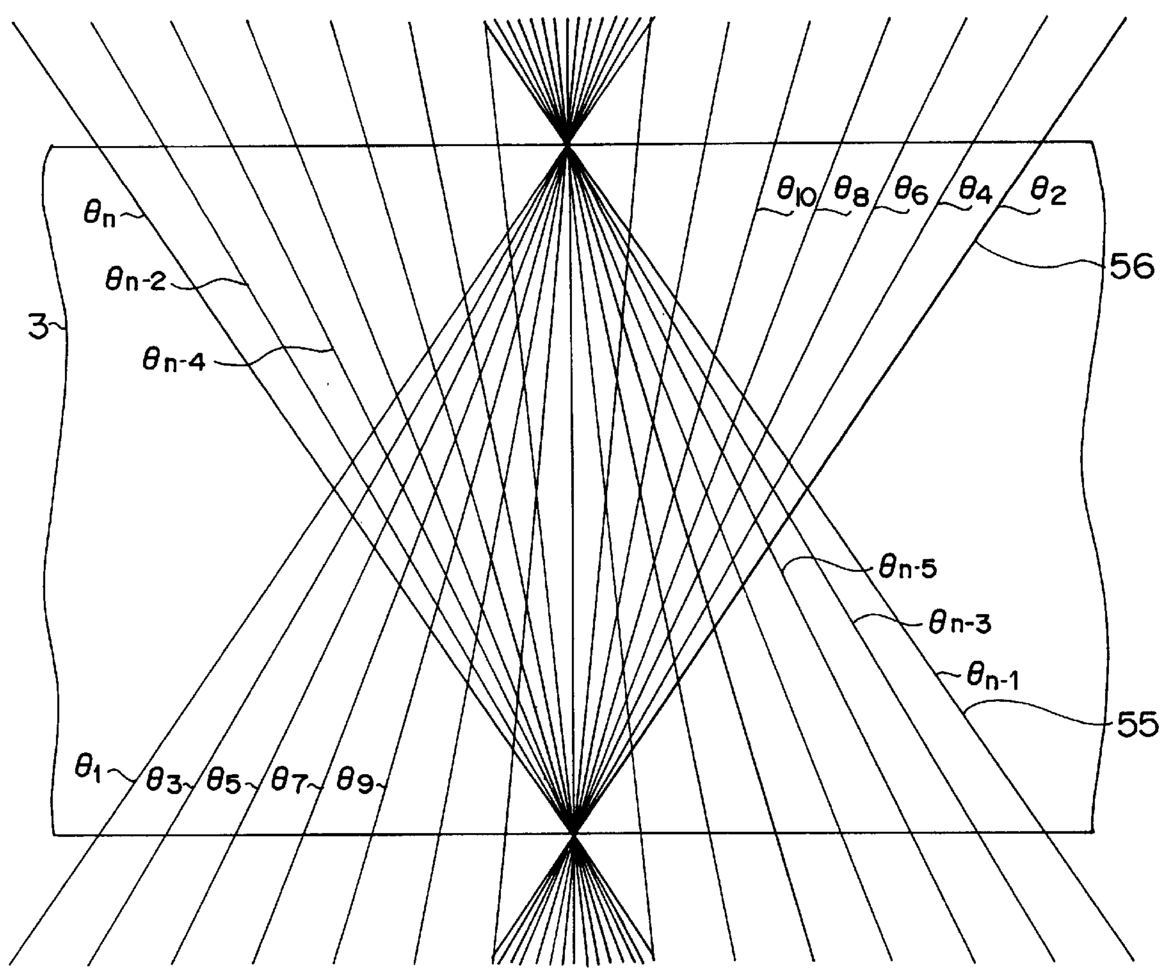
FIG. 13 is an illustration of a concept of interference in a holographic layer shown in FIGS. 11 and 12.

In this embodiment, the recording reference light also has undergone spatial modulation through the spatial optical modulator 16. In a particular sectional plane of the holographic layer 3, there may be some pixel-basis information light beams which do not form interference fringes due to absence of pixel-basis recording reference light beams in that plane. This, however, does not cause any problem because such pixel-basis information light beams necessarily meet pixel-basis recording reference light beams during passage through the holographic layer 3. As stated before, in the spatial optical modulator 16, one-bit information is represented by a couple of pixels which are necessarily set such that one of them is on while the other is off. Consequently, the quantity of the recording reference light is substantially constant regardless of the content of the information. FIG. 13 illustrates the concept of the volumetric interference between a pixel-basis reference light 55 and a pixel-basis information light 56 taking place in the holographic layer 3. For the purpose of simplification of the illustration, pixel-basis reference light 55 and a pixel-basis information light 56 are arranged alternately. The pixel-basis recording reference light 55 is a converging light having different angles θ1, θ3, . . . , θn−3, θn−1, while the pixel-basis information light 56 is a diverging light having different angles θ2, θ4, . . . , θn−2, θn.

As will be seen from this Figure, each pixel-basis information light 56 necessarily meet a pixel-basis recording reference light 55 within the holographic layer 3 so as to form an interference fringe.

In this embodiment, both the information light and the recording reference light enters the holographic layer 3 from the same side of the latter and runs towards the other side. Therefore, a hologram of transmissive type (Fresnel type) is formed in the holographic layer 3. When a reproducing reference light is applied to the holographic layer 3 having this type of hologram from one side of the holographic layer 3, reproduction light is emitted from the other side of the holographic layer 3.

Figure 14:
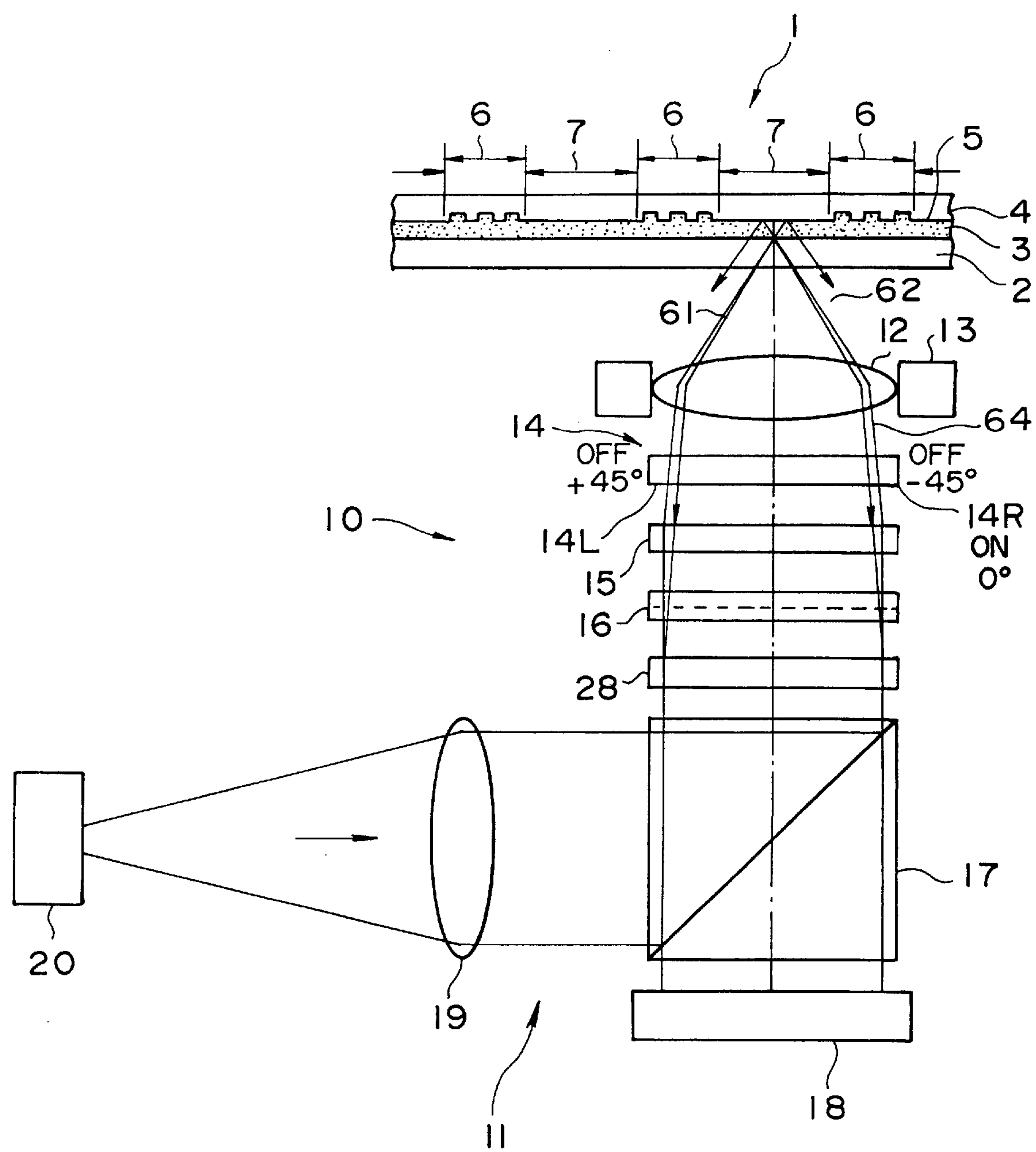
FIG. 14 is an illustration of the pickup of FIG. 2 in a playback operation.

A description will now be given of the playback operation. FIG. 14 is an illustration of the pickup 11 in the playback operation, while FIGS. 15 to 18 show states of light beams in the playback operation. As will be seen from these Figures, in the playback operation, all the pixels of the spatial optical modulator 16 are turned on, while the optical rotation plate 14L and optical rotation plate 14R of the split optical rotation plate 14 are turned off. The power of the light emitted from the laser coupler 20 is set to a low level suitable for playback. The controller 90 expects the timing at which the light from the objective lens 12 will pass through the data area 7, based on the basic clocks reproduced from the reproduction signal RF, and keeps the conditions set forth above during the period in which the light from the objective lens 12 passes through the data area 7. Both the focusing servo control an tracking servo control are inoperative so that the objective lens 12 is kept stationed.

The S-polarized laser light from the laser coupler 20 is collimated through the collimator lens 19 and impinges upon the polarizing beam splitter 17 so as to be reflected by the latter. The reflected light beam is made to pass through the P-polarized light hologram 28 without being affected, and impinges upon the spatial optical modulator 16. Since all the pixels of the spatial optical modulator 16 have been turned on, no rotation of the polarizing direction is effected so that the light which has passed the spatial optical modulator 16 remains to be S-polarized light. The S-polarized light having passed through the spatial optical modulator 16 is slightly converged by the S-polarized light hologram 15 and is condensed by the objective lens 12 so as to impinge upon the optical information recording medium 1 in such a manner as to minimize its diameter before reaching the interface between the holographic layer 3 and the protective layer 4 at which the diameter of the recording reference light is minimized. The light then runs through the holographic layer while diverging. This light is used as a reproducing reference light denoted by 61.

The portion of the light beam from the S-polarized light hologram 15 which is on the right side of the optical axis enters the optical rotation plate 14R of the split optical rotation plate 14 so as to undergo −45° rotation of the polarizing direction to become A-polarized light which will be referred to as a reference light 61R. The portion of the light beam from the S-polarized light hologram 15 which is on the left side of the optical axis enters the optical rotation plate 14L of the split optical rotation plate 14 so as to undergo +45° rotation of the polarizing direction to become B-polarized light which will be referred to as a reference light 61L. In this embodiment, primary reproduction lights are obtained from the holographic layer 3 as a result of application of the reference lights 61R and 61L and the primary reproduction lights thus obtained are reflected by the reflective film 5 so as to enter the holographic layer 3. The primary reproduction lights serve as secondary reference lights so that secondary reproduction lights are obtained from the holographic layer 3. Playback of the information is performed by using this secondary reproduction lights.

Figure 15:
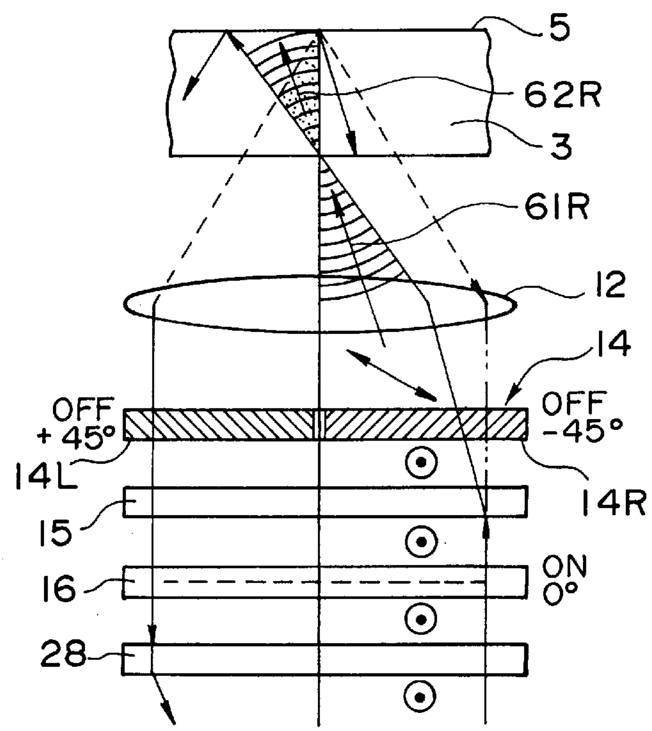
FIG. 15 is an illustration of states of light beams used in the pickup in the playback operation as shown in FIG. 14.

FIG. 15 shows the manner in which the primary reproduction light is generated as a result of application of the reference light 61R. As will be seen from this Figure, the reference light 61R converges such that its diameter is minimized at a thicknesswise position which is the same as the position at which the information light ON-R minimizes its diameter during the recording as shown in FIG. 11. Therefore, as a result of application of the reference light 61R, a primary reproduction light 62R, which corresponds to the recording reference light OFF-L used in the recording as shown in FIG. 11, is obtained from the holographic layer 3. More specifically, the reference light 61R used in the reproduction is a uniform light while the information light ON-R employed in the recording is a light which has been spatially modulated by the spatial optical modulator 16. Therefore, an optical computation is performed such that only the portion of the reproducing reference light 61R which corresponds to the recording information light ON-R contributes to the generation of the primary reproduction light 62R.

Figure 16:
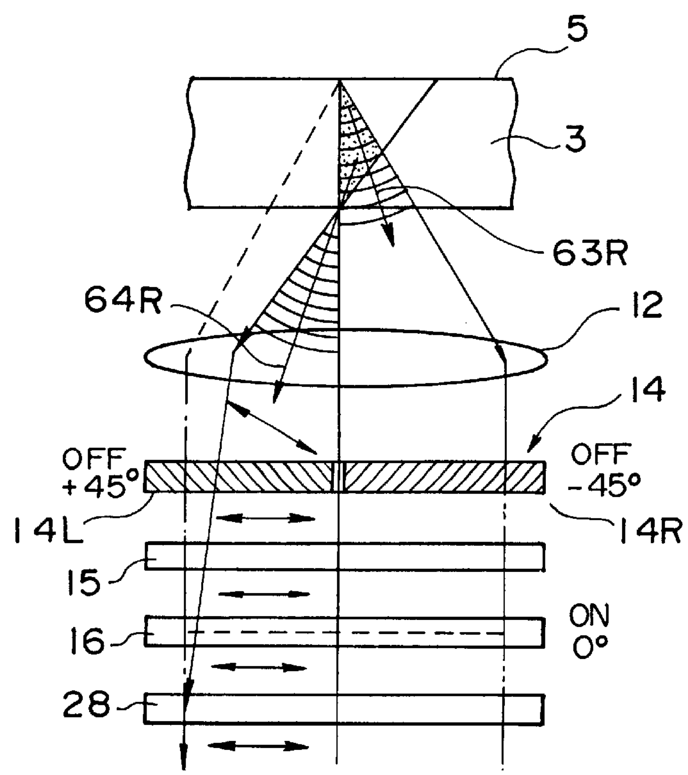
FIG. 16 is another illustration of states of light beams used in the pickup in the playback operation as shown in FIG. 14.

FIG. 16 illustrates the manner in which a secondary reproduction light is generated by the primary reproduction light 62R which serves as a secondary reference light. As will be sen from this Figure, the primary reproduction light 62R runs towards the reflective film 5 such that its diameter is minimized at the interface between the holographic layer 3 and the protective layer 4, and is reflected by the reflective film 5. The reflected primary reproduction light 62R, serving as a secondary reference light 63R, enters the holographic layer 3. The secondary reference light 63R converges so as to minimize its diameter at a thicknesswise position where the recording reference light OFF-R minimizes its diameter as shown in FIG. 12, but runs in the direction opposite to the direction of the recording reference light OFF-R. Consequently, a secondary reproduction light 64R, corresponding to the recording information light ON-L as shown in FIG. 12, is generated from the holographic layer 3 by the secondary reference light 63R. In this case also, an optical computation is performed so that only the portion of the secondary reference light 63R which corresponds to the recording reference light OFF-R contributes to the generation of the secondary reproduction light 64R.

The secondary reproduction light 64R is slightly converged by the objective lens 12 and is made to pass through the optical rotation plate 14L of the split optical rotation plate 14 so as to become a light beam of P-polarized light and then passes through the S-polarized light hologram 15 and the spatial optical modulator 16 without being affected, so as to impinge upon the P-polarized light hologram 28 to become a collimated beam. The collimated beam then enters the polarizing beam splitter 17 and passes through the polarizing beam splitter 17 to impinge upon the CCD array 18.

Figure 17:
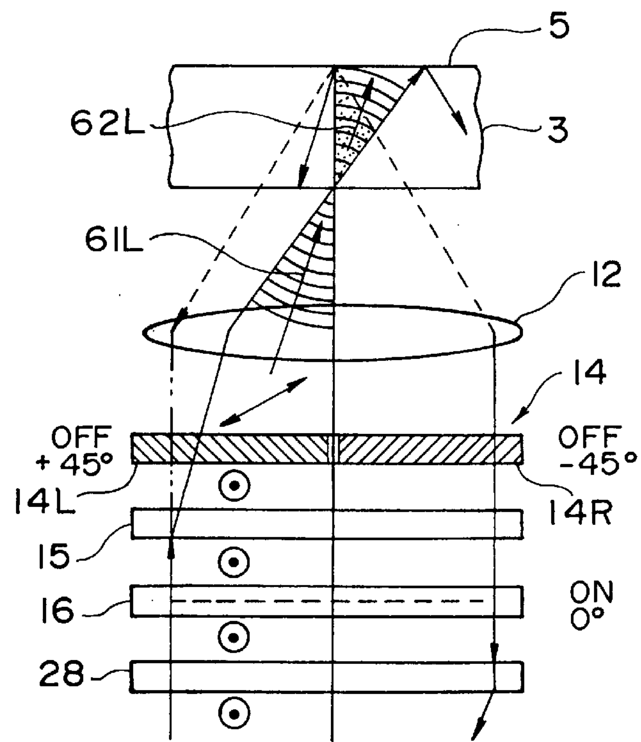
FIG. 17 is still another illustration of states of light beams used in the pickup in the playback operation as shown in FIG. 14.

FIG. 17 shows the manner in which the primary reproduction light is generated as a result of application of the reference light 61L. As will be seen from this Figure, the reference light 61L converges such that its diameter is minimized at a thicknesswise position which is the same as the position at which the information light ON-L minimizes its diameter during the recording as shown in FIG. 12. Therefore, as a result of application of the reference light 61L, a primary reproduction light 62L, which corresponds to the recording reference light OFF-R used in the recording as shown in FIG. 12, is obtained from the holographic layer 3. More specifically, the reference light 61L used in the reproduction is a uniform light while the information light ON-L employed in the recording is a light which has been spatially modulated by the spatial optical modulator 16. Therefore, an optical computation is performed such that only the portion of the reproducing reference light 61L which corresponds to the recording information light ON-L contributes to the generation of the primary reproduction light 62L.

Figure 18:
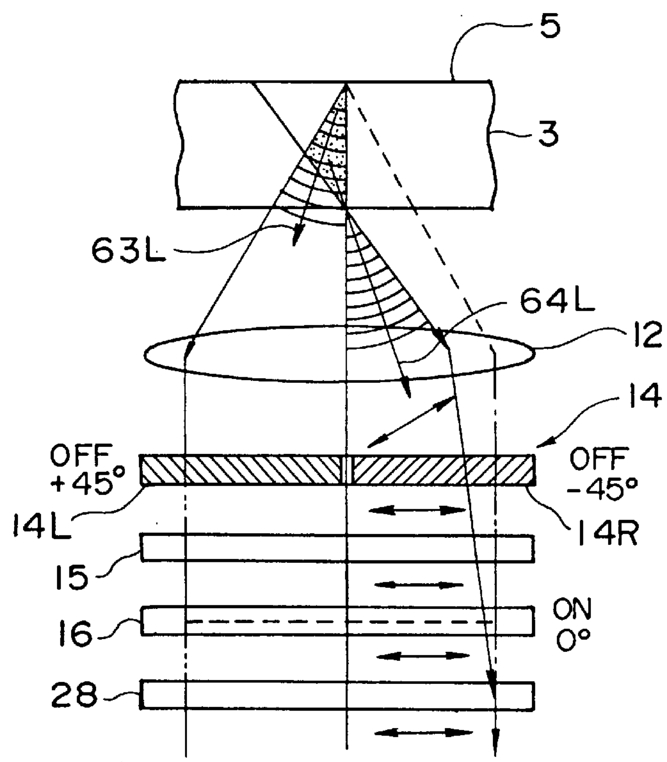
FIG. 18 is a further illustration of states of light beams used in the pickup in the playback operation as shown in FIG. 14.

FIG. 18 illustrates the manner in which a secondary reproduction light is generated by the primary reproduction light 62L which serves as a secondary reference light. As will be sen from this Figure, the primary reproduction light 62L runs towards the reflective film 5 such that its diameter is minimized at the interface between the holographic layer 3 and the protective layer 4, and is reflected by the reflective film 5. The reflected primary reproduction light 62L, serving as a secondary reference light 63L, enters the holographic layer 3. The secondary reference light 63L converges so as to minimize its diameter at a thicknesswise position where the recording reference light OFF-L minimizes its diameter as shown in FIG. 11, but runs in the direction opposite to the direction of the recording reference light OFF-L. Consequently, a secondary reproduction light 64L, corresponding to the recording information light ON-R as shown in FIG. 11, is generated from the holographic layer 3 by the secondary reference light 63L. In this case also, an optical computation is performed so that only the portion of the secondary reference light 63L which corresponds to the recording reference light OFF-L contributes to the generation of the secondary reproduction light 64L.

The secondary reproduction light 64L is slightly converged by the objective lens 12 and is made to pass through the optical rotation plate 14R of the split optical rotation plate 14 so as to become a light beam of P-polarized light and then passes through the S-polarized light hologram 15 and the spatial optical modulator 16 without being affected, so as to impinge upon the P-polarized light hologram 28 to become a collimated beam. The collimate beam then enters the polarizing beam splitter 17 and passes through the polarizing beam splitter 17 to impinge upon the CCD array 18.

Thus, the secondary reproduction lights 64R, 64L impinge upon the CCD array 18, so that only the portions of the CCD array 18 corresponding to the pixels of the spatial optical modulator 16 which were turned on during the recording are brightened to provide a two-dimensional pattern which is detected by the CCD array 18, whereby the information is reproduced. In FIG. 14, the reference light 61L and the reference light 61R are collectively represented as a playback reference light 61. Similarly, the secondary reproduction lights 64R and 64L are collectively represented as a reproduction light 64.

Figure 19:
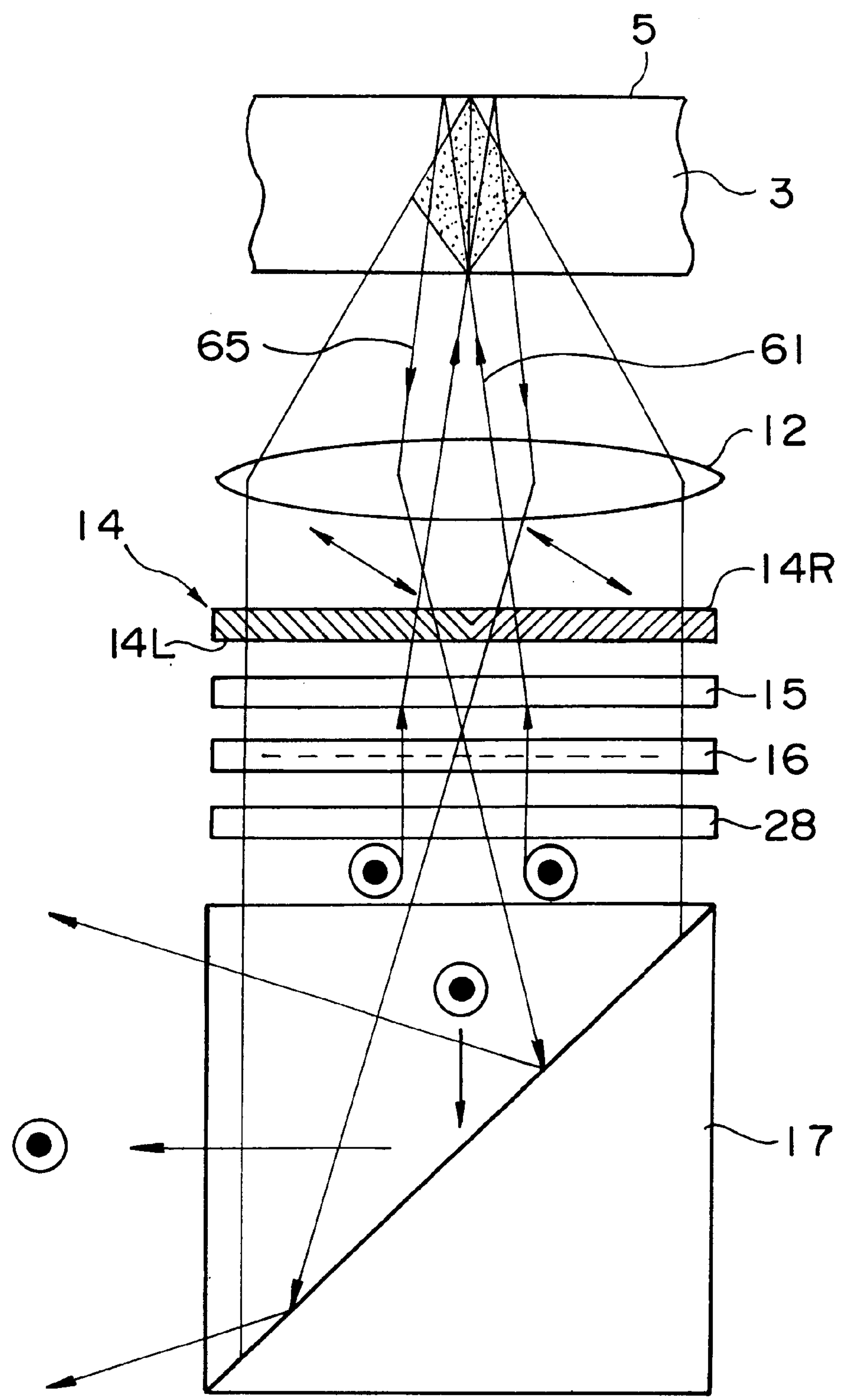
FIG. 19 is an illustration of the manner of removal of playback reference light from the pickup in the playback operation as shown in FIG. 14.

During the playback operation, the playback reference light 61 is reflected by the reflective film 5 of the optical information recording medium 1 towards the pickup 11. This returning light, however, does not substantially affect the detection of the reproduction light because the major part 64 of the returning light is in defocus state as shown in FIGS. 15 and 17. In the meantime, a small central portion 65 of the returning playback reference light 61 is concentrated to a central region of the spatial optical modulator 16 through the objective lens 12, as shown in FIG. 19. This returning light 65 is turned to P-polarized light by the split optical rotation plate 14. It is therefore possible to further improve the S/N ratio of the information detection performed by the CCD array 18, by turning only the central pixels of the spatial optical modulator 16 off so as to change the returning light 65 to S-polarized light which is then reflected by the polarizing beam splitter 17. Turning off only the central pixels of the spatial optical modulator 16 produces an additional effect in that any indefinite light which returns to the spatial optical modulator 16 through the central portion of the split optical rotation plate 14 is reflected by the polarizing beam splitter 17 so as to be separated from the reproduction light impinging upon the CCd array 18.

Figure 20A:
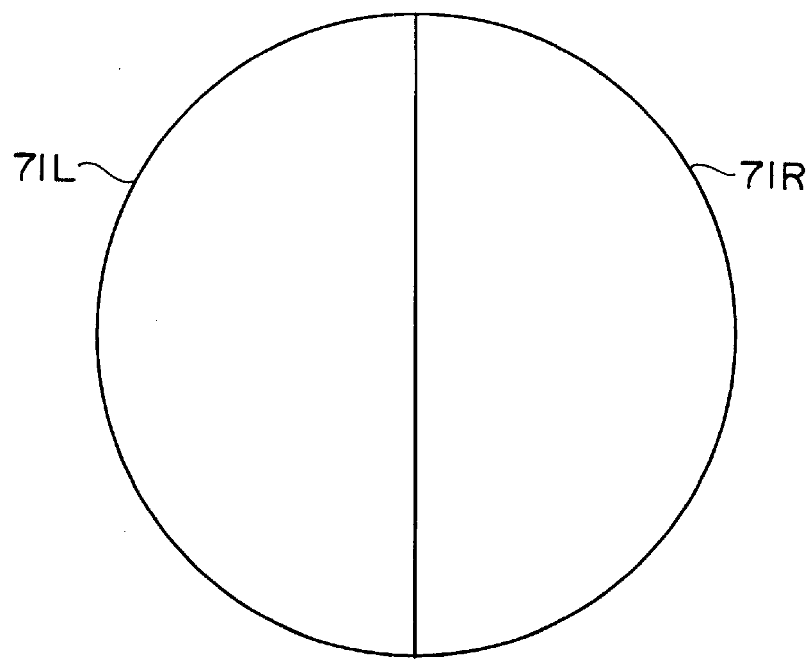
FIGS. 20A and 20B are an illustrations of a method for recognizing a reference position in a reproduced light pattern from the data detected by a CCD array shown in FIG. 2.
Figure 20B:
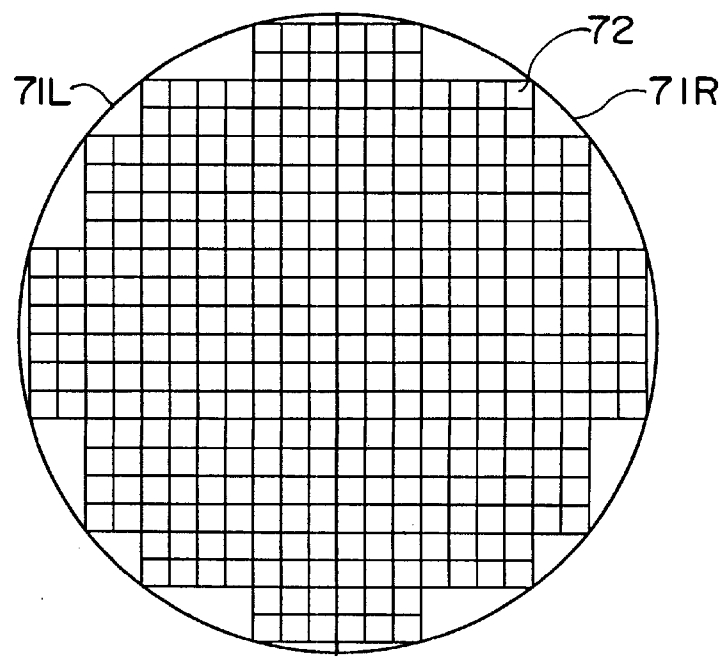
Figure 21A:
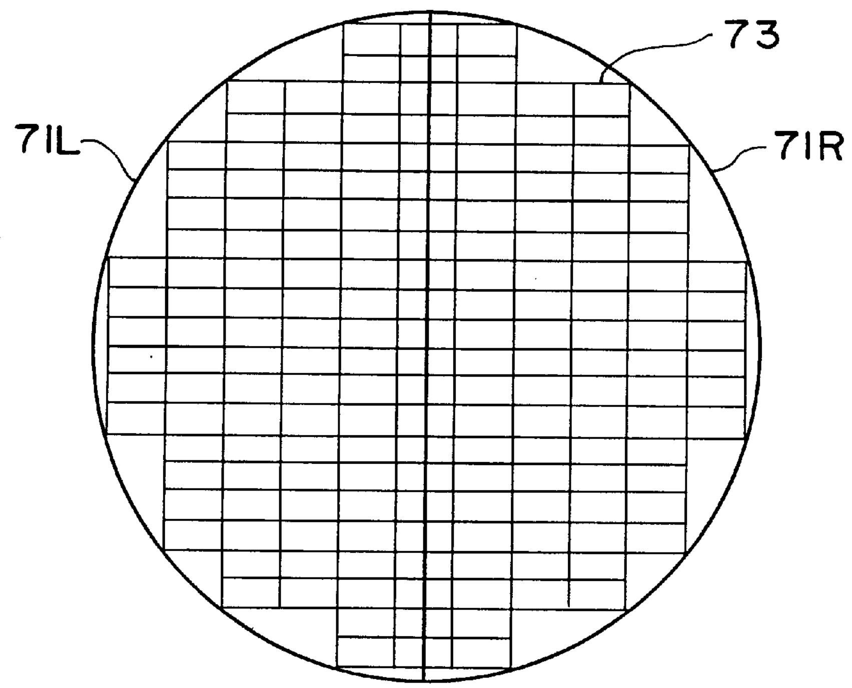
FIGS. 21A and 21B are illustrations of another method for recognizing a reference position in a reproduced light pattern from the data detected by a CCD array shown in FIG. 2.
Figure 21B:
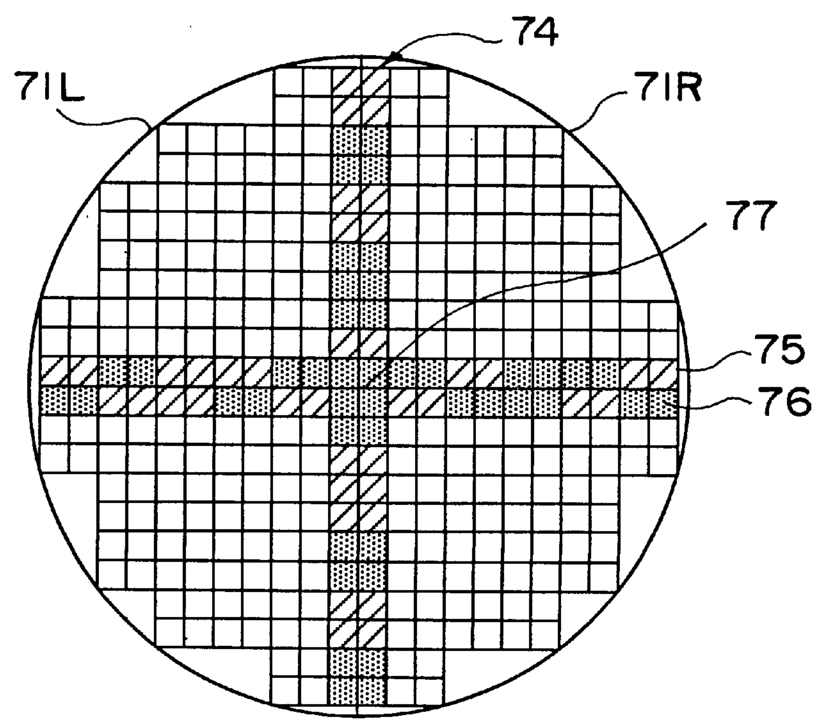

Detection of the two-dimensional pattern of the reproduction light by the CCD array 18 requires either exact locating of the reproduced light with respect to the CCD array 18 or exact recognition of a reference position in the reproduction light pattern from the data detected by the CCD array 18. The latter technique is adopted in this embodiment. A description will now be given as to a method for recognizing the reference position of the reproduction light pattern from the data output from the CCD array 18, with reference to FIGS. 20A to 21B. Referring to FIG. 20A, the aperture of the pickup 11 is divided into two regions 71L, 71R which are symmetrical to each other with respect to the optical axis, by the split optical rotation plate 14. At the same time, the aperture is divided into a plurality of pixels 72, by the spatial optical modulator 16. The pixel provides the minimum unit of the two-dimensional pattern data. In this embodiment, a couple of pixels represent a one-bit data of :0" or "1", and one of the two pixels corresponding to one-bit information is set to on, while the other is off. Thus, when both pixels are simultaneously on or off, the data obtained is error data. Representation of one-bit digital data by a couple of pixels offers an advantage such as improvement in the data detecting precision through a differential detection. FIG. 21A shows couples 73 of pixels each corresponding to one-bit digital data. The area containing the pixel couples 73 will be referred to as "data area". In this embodiment, reference position information indicative of the reference position in the reproduction light pattern is included in the information light, by making use of the feature that data is erroneous when both pixels of a pixel couple are simultaneously on or off. More specifically, a cross-shaped region 74 is assumed in the data area. The cross-shaped region 74 is constituted by a vertical row of pixel couples parallel to the split line of the split optical rotation plate 14 and a horizontal row of pixel couples perpendicular to the split line. Plural error data are intentionally arranged in a predetermined pattern this cross-shaped region. The pattern of error data will be referred to as "tracking pixel pattern". The tracking pixel pattern provides the reference position information. In FIG. 21B, numeral 75 denotes "on" pixels, while 76 denotes "off" pixels. As stated before, four pixels constituting the central region are always off, for the purpose of separation of the light which is the return of the playback reference light and which is denoted by 65.

Figure 22A:
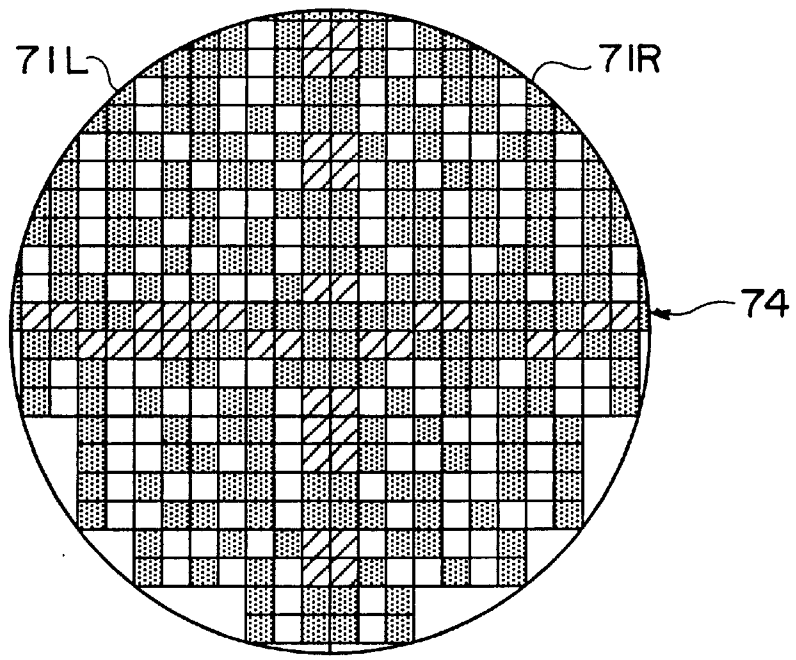
FIGS. 22A and 22B are illustrations of an information light pattern and a reproduced light pattern available in the pickup shown in FIG. 2.

A two-dimensional pattern as shown in FIG. 22A is obtained by superposing the tracking pixel pattern and the pattern corresponding to the data to be recorded. In this embodiment, the upper half part as viewed in the Figure of the area outside the data area is set to off, while the lower half part is set to on. Further, the marginal pixels of the data area contacting the pixels of the outside area are set to states which are opposite to the states of the contacting pixels of the outside area: namely, if a pixel in the outside area is off, the contacting marginal pixel of the data area is set to on, and vice versa. It is therefore possible to more distinctly detect the marginal edge of the data area from the data detected by the CCD array 18.

Figure 22B:
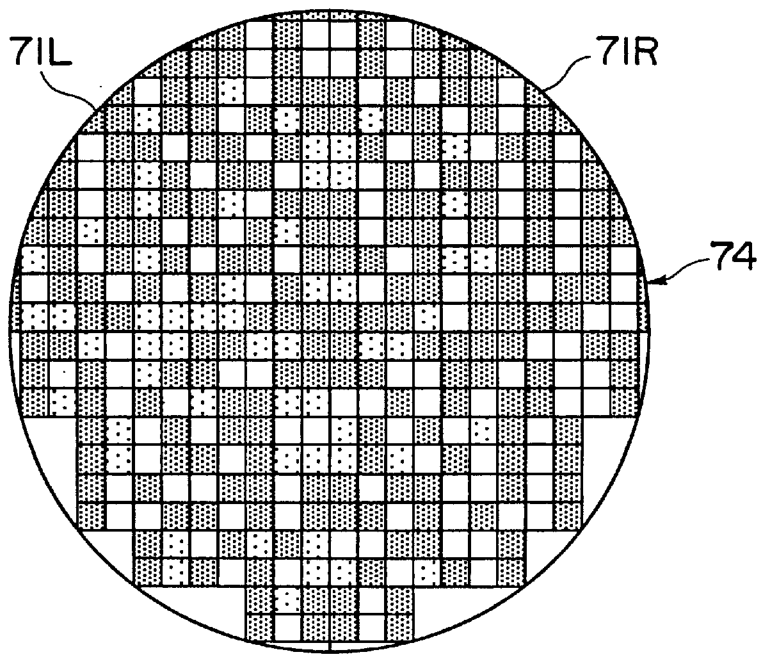

In the recording operation, information light is spatially modulated in accordance with the two-dimensional pattern shown in FIG. 22A and the interference pattern formed by the interference between the thus modulated information light and the recording reference light is recorded in the holographic layer 3. The reproduction light pattern obtained in the playback operation exhibits, as shown in FIG. 22B, a lower contrast than the recording pattern, thus suffering from inferior S/N ratio. In the playback operation, the reproduction light pattern as shown in FIG. 22B is detected and data is determined from the detected pattern. This determination is conducted by recognizing the tracking pixel pattern and using the recognized position as the reference position.

FIG. 23A illustrates the concept of the content of the data determined from the reproduction light pattern. Regions such as that denoted by A-1-1 represents one-bit data. In the illustrated embodiment, the data area is divided into four zones 78A, 78B, 78C and 78D by the cross-shaped region 74 which carries the tracking pixel pattern. A rectangular area is formed by adjoining two diagonal zones 78A and 78C. Similarly, a diagonal area is formed by adjoining other two diagonal zones 78B and 78D. These two rectangular areas are adjoined one on the other, so that an ECC table is formed. The ECC table is a data table which is formed by adding, to the data to be recorded, error correction codes (ECC) such as CRC (cyclic redundancy check) code. The ECC table shown in FIG. 23B has a matrix form constituted by n-lines and m-columns. This construction of the ECC table, however, is not exclusive and may be designed without restriction. The data arrangement shown in FIG. 23A is constituted by a part of the ECC table shown in FIG. 23B. The portion of the ECC table shown in FIG. 23B which is not used for the data arrangement shown in FIG. 23A takes a constant value regardless of the content of the data. In the recording operation, the ECC table 23A shown in FIG. 23B is disassembled into the four zones 78A, 78B, 78C and 78D which are then reassembled as shown in FIG. 23A so as to be recorded in the optical information recording medium 1. In the playback operation, data arrangement such as that shown in FIG. 23A is detected and rearranged to reproduce an ECC table such as that shown in FIG. 23B. Playback of the data is then performed through error correction based on the ECC table.

Operations including the recognition of the reference position (tracking pixel pattern position) in the reproduction light pattern and the correction of errors are performed by the signal processing circuit 89 which is shown in FIG. 3.

As will be understood from the foregoing, the optical information recording/reproducing apparatus and the optical information recording medium 1 of the described embodiment are constructed such that the irradiation of the optical information recording medium 1 with the recording reference light and information light during the recording, as well as irradiation of the optical information recording medium 1 with the playback reference light and detection of the reproduction light during playback, are executed from an identical side of the optical information recording medium 1 along an identical optical axis. It is therefore possible to reduce the size recording or playback optical system as compared with that of known holographic recording system. In addition, problems such as stray light, which is encountered by the conventional holographic recording system, is eliminated. Furthermore, the optical system used in the described embodiment for recording and playback can be constructed in the form of a pickup 11 similar to those used in ordinary optical disk apparatuses.

Furthermore, in the optical information recording/reproducing apparatus 10 and the optical information recording medium 1 of the described embodiment, the focusing servo control and the tracking servo control are performed by using focusing servo information and tracking servo information which are recorded in the optical information recording medium 1, so that the light for recording or playback can be precisely located. This improves the removability of the medium and facilitates random access, while increasing the storage capacity and transfer rate.

It is also to be noted that the optical information recording/reproducing apparatus 10 of the described embodiment eliminates generation of unnecessary interference fringes so as to prevent degradation of the S/N ratio, by virtue of the fact that the polarizing direction of the recording reference light and the information light at the region on the left side of the optical axis is set to be orthogonal to that at the region which is on the right side of the optical axis.

The optical information recording/reproducing apparatus 10 of the described embodiment further offers an advantage in that the pattern of the reproduction light can easily be recognized because reference position information indicative of the reference position in the reproduction light pattern is includes in the information light.

In addition, the optical information recording/reproducing apparatus 10 of the described embodiment can be compatible with conventional optical disk apparatuses, because the split optical rotation plate 14 and the spatial optical modulator 16, which are formed by using liquid crystal, can be made inoperative as desired.

Figure 24:
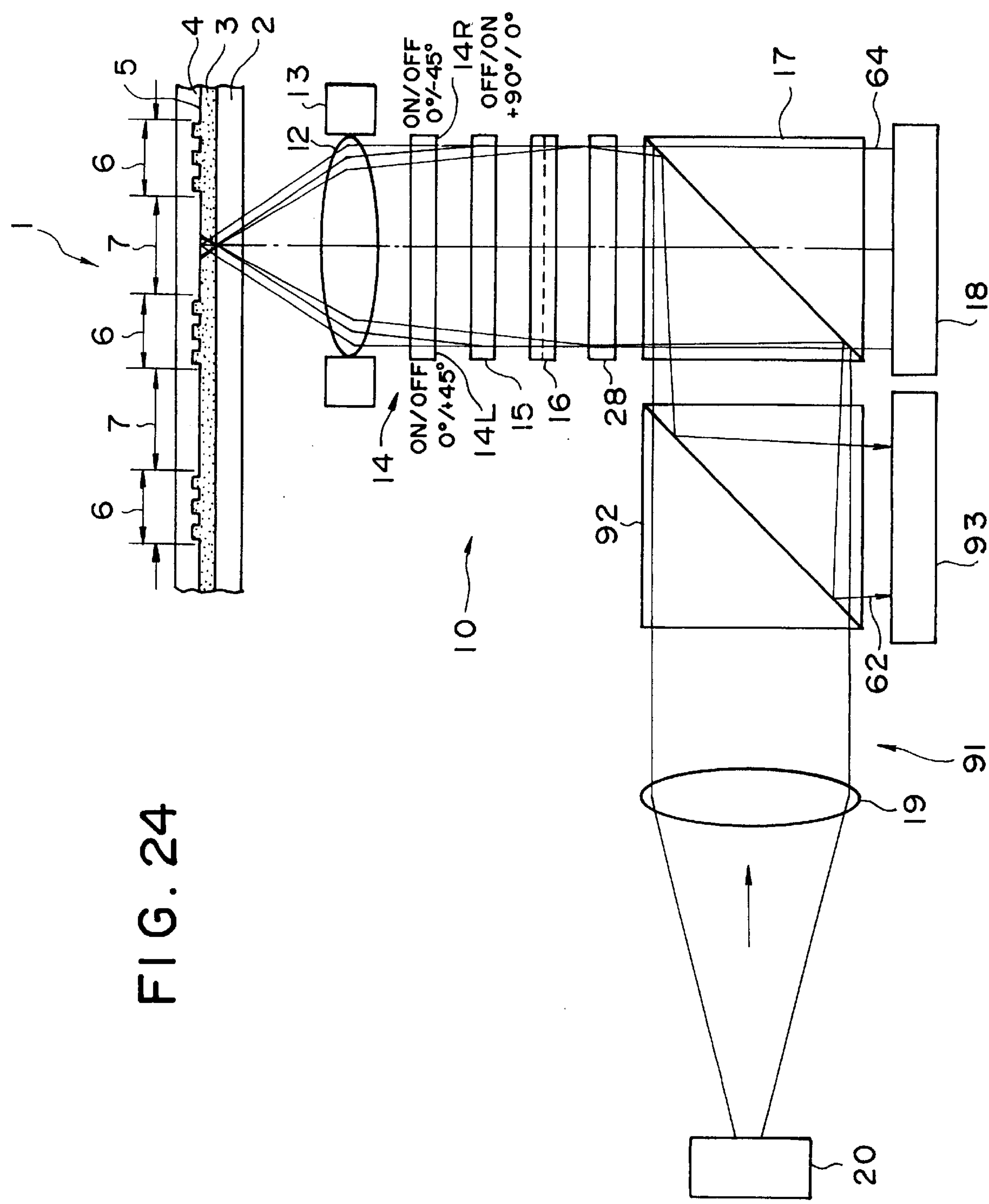
FIG. 24 is an illustration of a pickup used in an optical recording/playback apparatus in accordance with a second embodiment of the present invention.

FIG. 24 shows the construction of the pickup in a second embodiment of the optical information recording/playback apparatus of the present invention. In contrast to the pickup 11 of the first embodiment, the pickup 91 used in this second embodiment additionally has a beam splitter 92 interposed between the collimator lens 19 and the polarizing beam splitter 17, and an additional CCD array 93 is disposed at a lateral side of the beam splitter 92. The beam splitter 92 is an optical element which transmits half of the incident light and reflects the remainder half of the same. The output signals from the CCD arrays 18 and 93 are delivered to the signal processing circuit 83 shown in FIG. 3.

The operation of the optical information recording/reproducing apparatus of this embodiment is as follows. During the servo control operations, as well as recording operation, the S-polarized laser light from the laser coupler 20 is collimated by the collimator lens 19 so as to impinge upon the beam splitter 92. Half light quantity of the collimated light is allowed to pass through the beam splitter 92 so as to impinge upon the polarizing beam splitter 17 and is reflected by the latter. Other portions of the servo control operations and recording operation are the same as those in the first embodiment.

In the playback operation, the S-polarized laser light from the laser coupler 20 is collimated by the collimator lens 19 and the collimated light beam impinges upon the beam splitter 92. Half light quantity of the collimated light is allowed to pass through the beam splitter 92 so as to impinge upon the polarizing beam splitter 17 and is reflected by the latter. During the playback operation, the spatial optical modulator 16 and the split optical rotation plate 14 are kept in the same states as those in the first embodiment. Therefore, in the same manner as that in the first embodiment as described before in connection with FIGS. 15 to 18. Namely, primary reproduction lights 62R, 62L are generated from the holographic layer 3 by the application of reference lights 61R, 61L and are reflected by the reflective film 5 to become secondary reference lights 63R, 63L which enter the holographic layer 3 to generate secondary reproduction lights 64R, 64L. These secondary reproduction lights 64R, 64L are slightly converged by the objective lens 12 and is changed into light beams of P-polarized lights through the split optical rotation plate 14 and are allowed to pass through the S-polarized light hologram 15 and the spatial optical modulator 16 without being affected, so as to impinge upon the P-polarized light hologram 28 to become collimated beams which are then introduced into and transmitted through the polarizing beam splitter 17 so as to impinge upon the CCD array 18. In FIG. 24, the secondary reproduction lights 64R and 64L are collectively represented as a secondary reproduction light 64. The operation described hereinabove is the same as that in the first embodiment.

The second embodiment now described employs, besides the secondary reproduction lights 64R, 64L received by the CCD array 18, the primary reproduction lights 62R, 62L for the purpose of playback of the information. More specifically, the primary reproduction lights 62R, 62L are reflected by the reflective film 5 and are collimated through the objective lens 12. The collimated beams are then made to pass through the optical rotation plate 14R and the optical rotation plate 14L of the split optical rotation plate 14 so as to become light beams of S-polarized light. These primary reproduction lights 62R, 62L are slightly converged by the S-polarized light hologram 15 and are made to pass through the spatial optical modulator 16 and the P-polarized light hologram 28 without being affected, and enter the polarizing beam splitter 17 so as to be reflected by the latter into the beam splitter 92. Half light quantity of each light is reflected by the beam splitter 92 so as to impinge upon the CCD array 93. In FIG. 24, the primary reproduction light 62L and the primary reproduction light 62R are collectively represented as a primary reproduction light 62.

A description will now be given of the relationship between the primary reproduction light 62 received by the CCD array 93 and the secondary reproduction light 64 received by the CCD array 18. The primary reproduction light 62 is a light beam reproduced by the reference light 61 which corresponds to the information light ON-R, ON-L employed in the recording as shown in FIGS. 11 and 12. Thus, the primary reproduction light 62 is a light beam which has the same pattern as the recording reference light OFF-R, OFF-L. Meanwhile, the secondary reproduction light 64 is a light beam reproduced by the primary reference light 62 which corresponds to the reference light OFF-R, OFF-L used in the recording and, therefore, is a light beam having the same pattern as the recording information light ON-R, ON-L. As will be understood from the description of the first embodiment, the pattern of the reference light OFF-R (OFF-L) is complementary to the pattern of the information light ON-R (ON-L). Consequently, the primary reproduced light 62 and the secondary reproduced light 64 are light beams which have complementary patterns of brightness and darkness to each other. This means that both the primary and secondary reproduction lights 62 and 64 carry information recorded in the holographic layer 3.

In this embodiment, the information recorded in the holographic layer 3 is played back through a technique so-called "differential detection" based on the difference between the pattern of the primary reproduction light 62 and the secondary reproduction light 64. The light quantity and the pattern size of the primary reproduction light 62 directed to the CCd array 93 are different from those of the secondary reproduction light 64 directed to the CCD array 18. Practically, therefore, a matching between the pattern size of the primary reproduction light 62 and the pattern size of the secondary reproduction light 64 is performed optically through, for example, a lens or, alternatively, output signal of one or both of the CCD arrays 93 and 18 is suitably processed so as to equalize the sizes of the output patterns. At the same time, a corrected signals based on the outputs from the CCD array 93 and the CCD array 18 are obtained with the outputs of both CCD arrays 93, 18 set to the same level, and the different between both corrected signals are determined based on which the information recorded in the holographic layer 3 is played back. The signal processings on the output signals from the CCD arrays 93, 18 are performed by the signal processing circuit 89 shown in FIG. 3.

Thus, in the operation of the optical information recording/reproducing apparatus of this embodiment, two light beams having complementary patterns are obtained from the holographic layer 3 as a result of application of the playback reference light 61 to the holographic layer 3, and the information recorded in the holographic layer 3 is played back by differential detection technique, based on the difference between both patterns. Consequently, any D.C. noise components which are superposed to the patterns of two light beams are canceled, so as to improve the S/N ratio. Other structural and operational features, as well as advantages, of this embodiment are the same as those offered by the first embodiment.

A description will now be given of a third embodiment of the optical information recording/reproducing apparatus of the present invention. The whole structure of this apparatus is substantially the same as that of the optical information recording/reproducing apparatus 10 used in the first embodiment and described before in connection with FIG. 3, although it employs a pickup having a construction different from that of the pickup used in the first embodiment.

Figure 26:
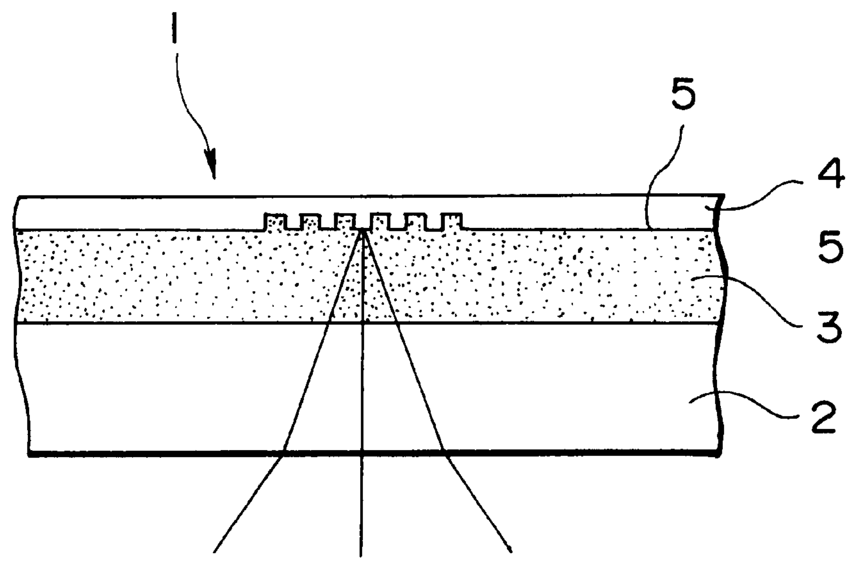
FIG. 26 is an illustration of the construction of an optical information recording medium used in the third embodiment.
Figure 27:
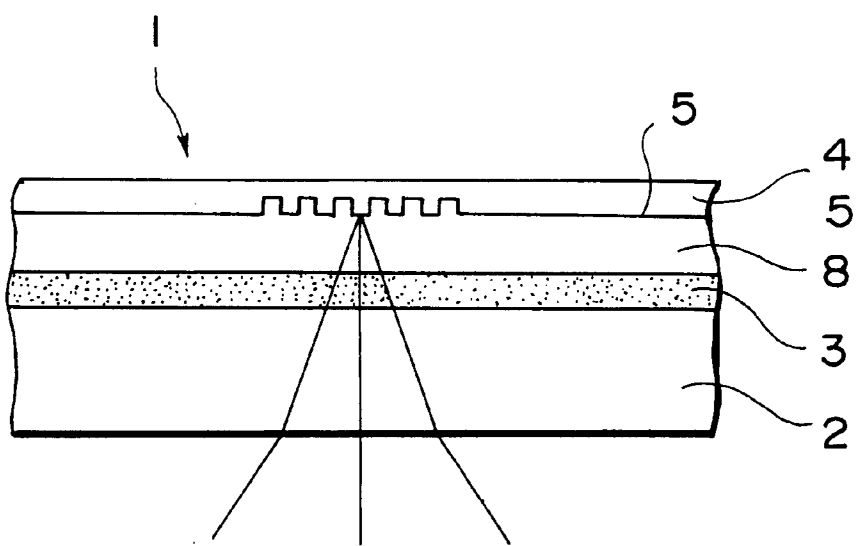
FIG. 27 is an illustration of the construction of another example of the optical information recording medium used in the third embodiment.

The optical information recording medium 1 used in the optical information recording/reproducing apparatus of this embodiment may be of the type which has, as in the first embodiment, a transparent substrate 2 and a laminate of a holographic layer 3, a reflective film 5 and a protective layer 4 sequentially formed on one side of the transparent substrate 2 in the mentioned order, as shown in FIG. 26. FIG. 27 shows the construction of a different type of optical information recording medium 1 in which a holographic layer 3, a transparent medium layer 8, a reflective film 5 and a protective layer 4 are sequentially formed in the mentioned order on one side of the transparent substrate 2, with the thickness of the holographic layer 3 determined to be smaller than that of the holographic layer 3 shown in FIG. 26. The transparent medium layer 8 is formed of a material such as glass. A reflective surface presented by the reflective film 5 has, as in the case of known optical disks, emboss pits such as wobble pits for use in sampled servo control and address bits used for detecting the beam position on the optical information recording medium 1, as well as grooves for use in the tracking servo control. When sampled servo technique is used, the optical information recording medium 1 has address servo areas 6 at a regular angular spacing as shown in FIG. 2, with the area between adjacent address servo areas being used as the data area 7, as in the case of the first embodiment.

Figure 25:
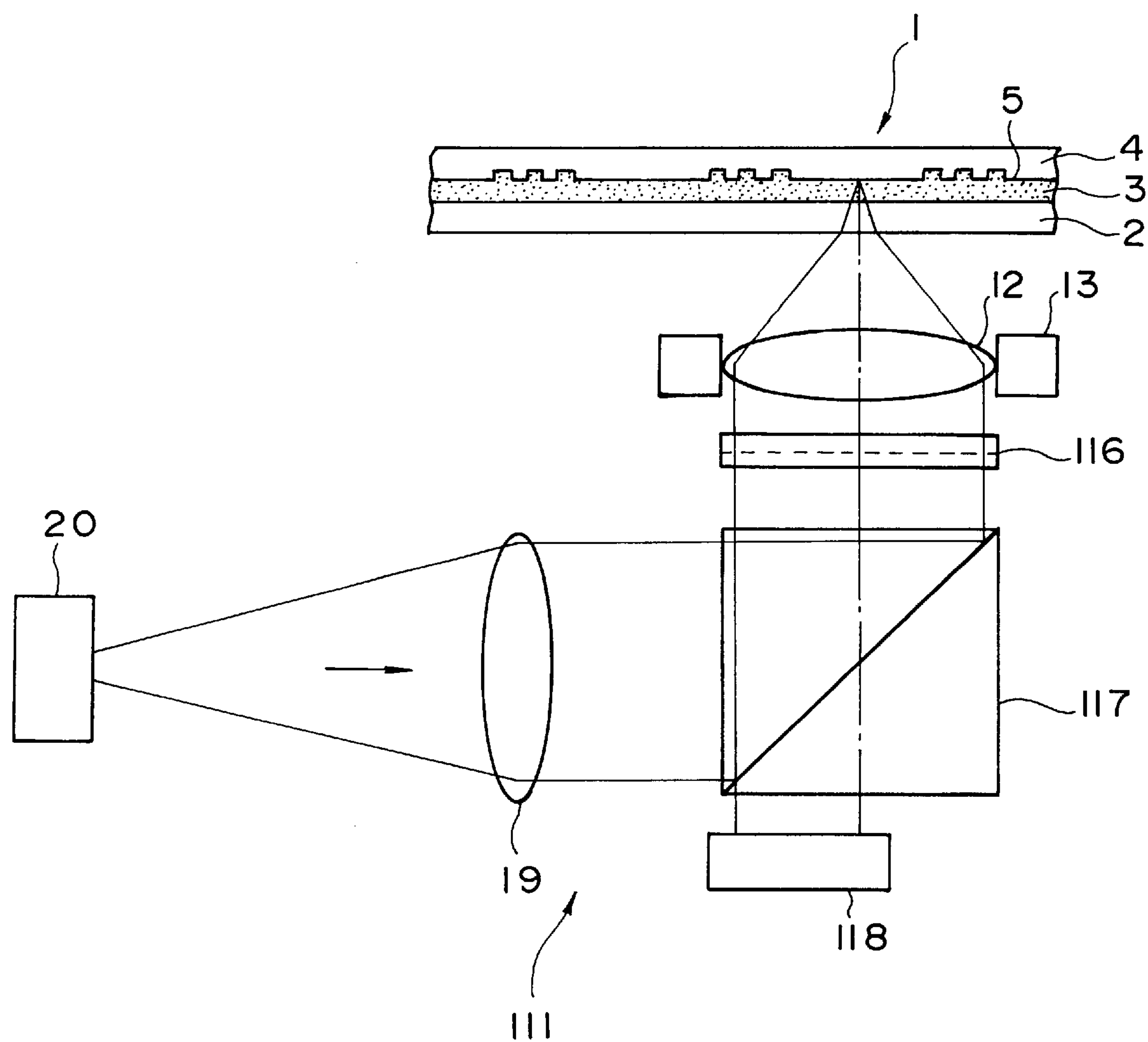
FIG. 25 is an illustration of a pickup used in an optical recording/playback apparatus in accordance with a third embodiment of the present invention.

FIG. 25 is an illustration of the construction of the pickup used in this embodiment. The pickup 111 has an objective lens 12 which faces the transparent substrate 2 of the optical information recording medium 1 when the latter is fixed to the spindle 81, an actuator 13 capable of driving the objective lens 12 both in the radial and thicknesswise direction of the optical information recording medium 1, a spatial optical modulator 116, a beam splitter 117 and a CCd array 118 which are disposed in the mentioned order on the opposite side of the objective lens 12 to the optical information recording medium 1, a laser coupler 20 disposed at a lateral side of the beam splitter 117, and a collimator lens disposed between the laser coupler 20 and the beam splitter 117. The spatial optical modulator 116 used in this embodiment has a multiplicity of pixels arranged in a matrix or grating-like form. Each pixel can selectively take transmissive or non-transmissive state, so that the light can be spatially modulated in terms of light intensity. The spatial optical modulator 116 may be constituted by, for example, a liquid crystal display device. The beam splitter 117 is an optical element which transmits half of the light beam incident thereto, while reflecting the remainder half of the same.

The output signal from the CCD array 118 is delivered to the signal processing circuit 83 shown in FIG. 3. The spatial optical modulator 116 is under the control of the controller 90 which also is shown in FIG. 3.

A description will now be given of the operation of the optical information recording/playback apparatus, as well as the optical information recording medium 1, of this embodiment. The description will begin with the servo control operation, assuming that the control is performed in accordance with sampled servo technique, followed by description of recording operation which in turn is followed by description of playback operation. In each of these operations, the optical information recording medium 1 is driven by the spindle motor 82 while being controlled to a predetermined constant rotation speed.

The servo control operation will be described. All the pixels of the spatial optical modulator 116 are set to the transmissive state. The level of the light output from the laser coupler 20 is set to a low level which is the same level as that used during the playback operation. The controller 90 expects, based on the basic clocks reproduced from the reproduction signal RF, the timing at which the light emitted from the objective lens 12 passes through the address servo area 6, so as to maintain the above-mentioned output power level when the light from the objective lens 12 passes through the address servo area 6.

A coherent light emitted rom the laser coupler 20 is collimated into a collimated light beam by means of the collimator lens 19. The collimated light beam is made to be incident to the beam splitter 117 so that half of the collimated light beam is reflected by the beam splitter 117. The reflected light beam is made to pass through the spatial optical modulator 116 and is then condensed by the objective lens 12 and is applied to the optical information recording medium 1 in such a converging manner that the diameter of the beam is minimized at the interface between the holographic layer 3 and the protective layer 4, i.e., at the reflective film 5, of the optical information recording medium 1. The light beam is reflected by the reflective film 5 of the optical information recording medium 1 back to the objective lens 12, after being modulated in accordance with the emboss pits in the address servo area 6. The returning reflected light is collimated by the objective lens 12 and is passed through the spatial optical modulator 116 to impinge upon the beam splitter 117 which reflects half light quantity of the incident beam. The reflected beam impinges upon the laser coupler 20, so as to be detected by the photo-detectors 25, 26 shown in FIGS. 4 and 5. The detecting circuit 85 shown in FIG. 6 generates the focus-error signal FE, tracking error signal TE and the reproduction signal RF, based on the outputs from the photo-detectors 25 and 26. Focusing servo control and tracking servo control, as well as generation of basic clocks and determination of the address, are performed in accordance with these signals.

The arrangement of the pickup 111 during the servo control operation as described is the same as that of recording or playback pickups for ordinary optical disks such as CD (compact disk), DVD (digital video disk) and HS (hyper storage disk). Therefore, the optical information recording/reproducing apparatus 10 of this embodiment may be constructed so as to be compatible with that for ordinary optical disk apparatuses.

Figure 28:
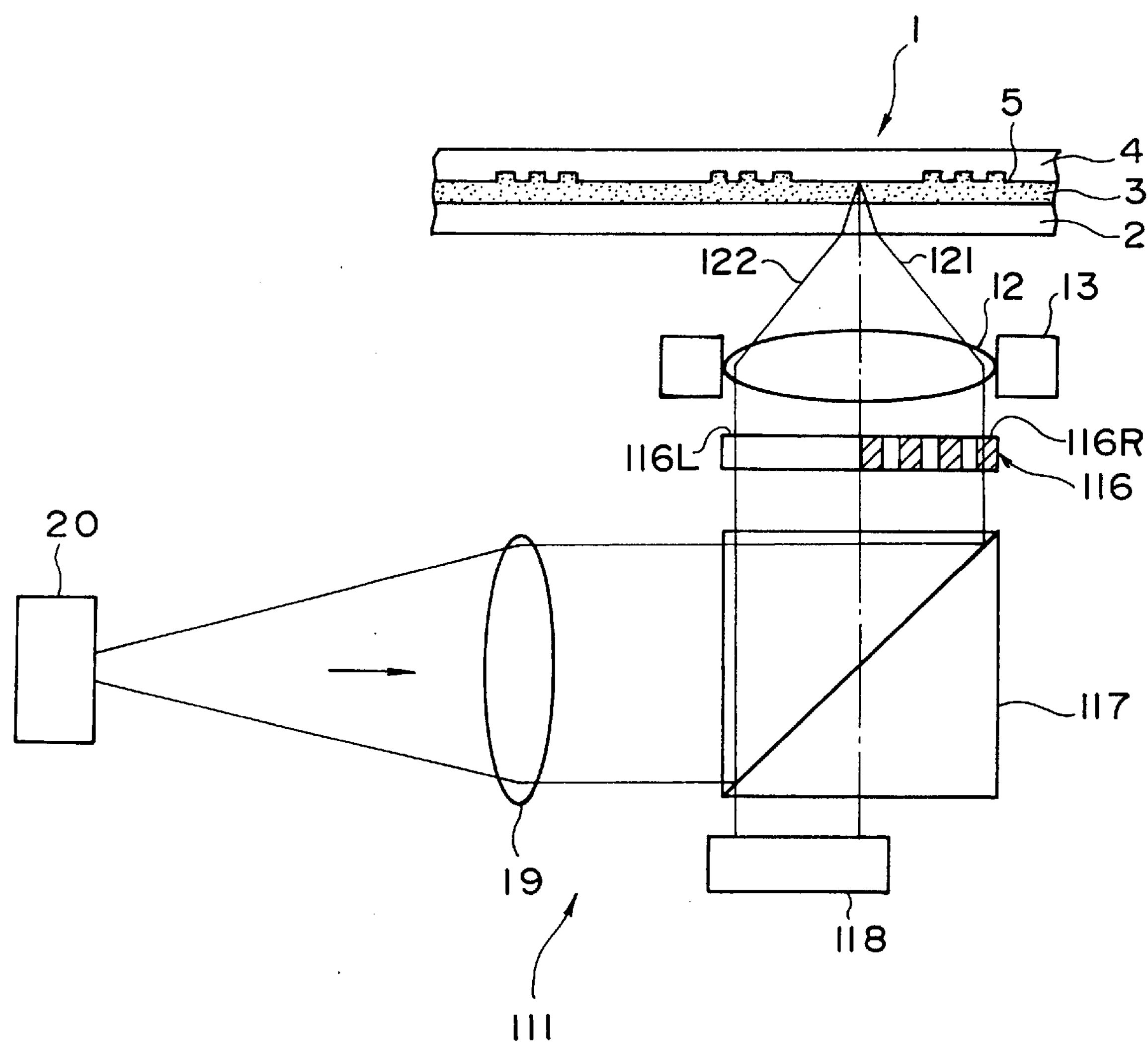
FIG. 28 is an illustration of the pickup shown in FIG. 25 in a recording operation.

A description will now be given of the recording operation. FIG. 28 is an illustration of the state of the pickup 111 in the recording operation, FIG. 29 is an illustration of the state of the spatial optical modulator 116 in the recording and FIG. 30 is an illustration of the states of the light inside the optical information recording medium 1.

Figure 29:
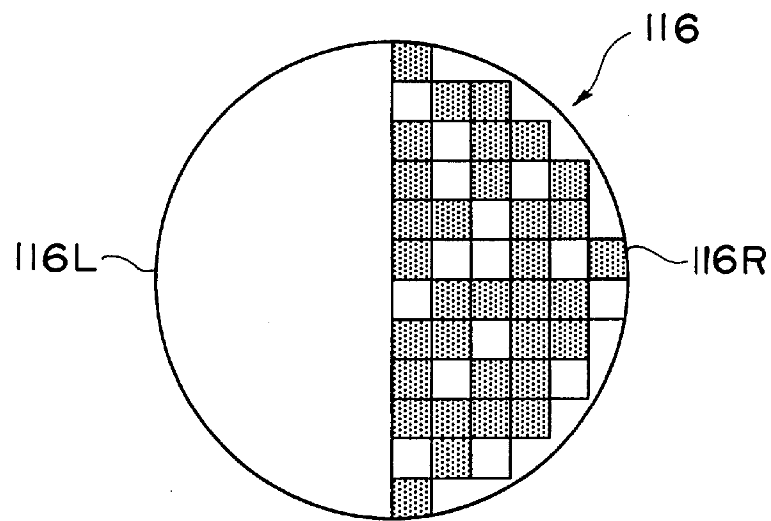
FIG. 29 is an illustration of a spatial optical modulator used in the pickup which is in the recording operation as shown in FIG. 28.
Figure 30:
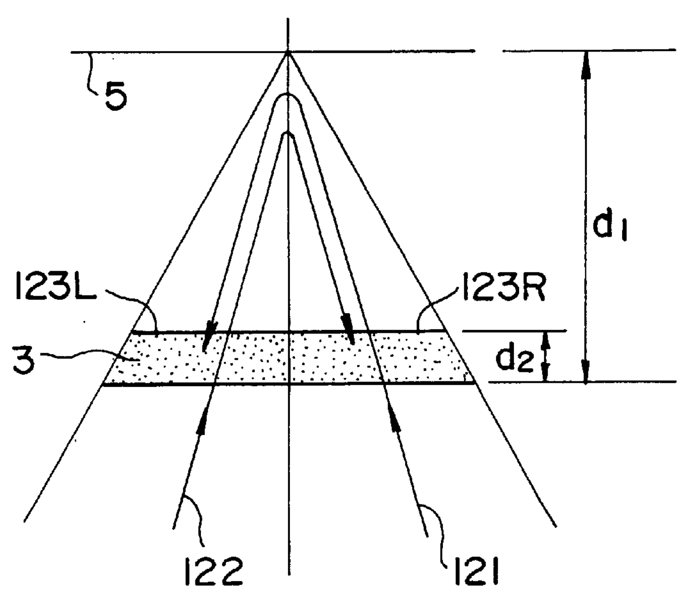
FIG. 30 is an illustration of the states of different types of light in the optical recording medium in the recording operation as shown in FIG. 28.

As will be seen from FIG. 29, in the recording operation, the states of the pixels, whether transmissive or non-transmissive, are selectable independently in accordance with the information to be recorded, in the right half region 116R of the spatial optical modulator 116, whereas, in the left half region 116L, all the pixels are set to transmissive state. The light emitted from the laser coupler 20 is controlled to provide light pulses of a high power level suitable for the recording. The controller 90 expects, based on the basis clocks reproduced from the reproduction signal RF, the time at which the light emitted from the objective lens 12 will pass through the data area 7, and keeps the conditions set forth above during the period in which the light from the objective lens 12 passes through the data area 7. During this period, the focusing servo control and the tracking servo control are kept inoperative so that the objective lens 12 is fixed.

The laser light emitted from the laser coupler 20 is collimated by a collimator lens 19 and the collimated beam impinges upon the beam splitter 117. Half light quantity of the beam is reflected by the beam splitter and enters the spatial optical modulator 116. As a consequence, the light which has passed through the right half region 116R of the spatial optical modulator 116 has been modulated in accordance with the information to be recorded. In this embodiment, this modulated light constitutes information light 121. In contrast, the beam impinging upon the left half region 116L of the spatial optical modulator 116 has not been modulated. In this embodiment, this light which has not been modulated is used as reference light 122. As will be seen from FIG. 30, both the information light 121 and the reference light 122 are condensed by the objective lens 12 so that they run through the holographic layer 3 while converging in such a manner as to minimize their diameters at the reflective film 5. The information light 121 and the reference light 122 are reflected by the reflective film 5 and again run through the holographic layer 3 while diverging. In the region 123R of the holographic layer 3 through which the converging information light 121 runs, the converging information light 121 interferes with the diverging reference light reflected by the reflective film 5, so that an interference fringes are formed and recorded in a volumetric manner. Meanwhile, in the region 123L of the holographic layer 3 through which the converging reference light 122 runs, the converging reference light 122 interferes with the diverging information light 121 reflected by the reflective film 5, so that interference fringes are formed and recorded in the holographic layer 3 in a volumetric manner. Both in the regions 123R and 123L, the information light 121 and the reference light 122 interfering with each other run in opposite directions, so that reflection type hologram (Lippmann type hologram) is formed in the holographic layer 3. As will be seen from FIG. 30, the thickness of the holographic layer 3 may be equal to the distance $d_1$ between the transparent substrate 2 and the reflective film 5 or may be smaller as indicated by $d_2$.

Figure 31:
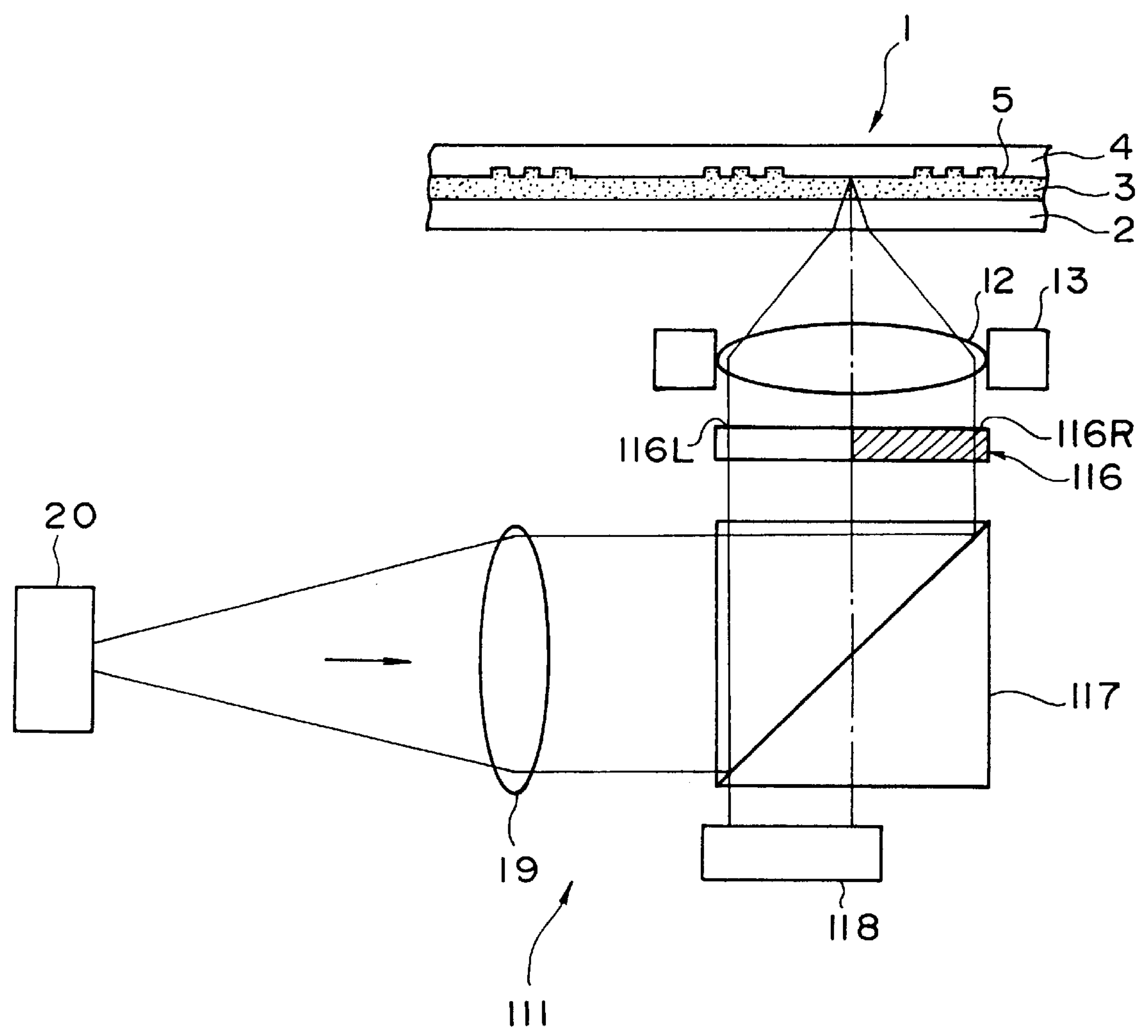
FIG. 31 is an illustration of the pickup shown in FIG. 25 in a playback operation.

A description will now be given of the playback operation. FIG. 31 is an illustration of the state of the pickup 111 in the playback operation, FIG. 32 is an illustration of the state of the spatial optical modulator 116 in the playback and FIG. 33 is an illustration of the states of the light inside the optical information recording medium 1.

Figure 32:
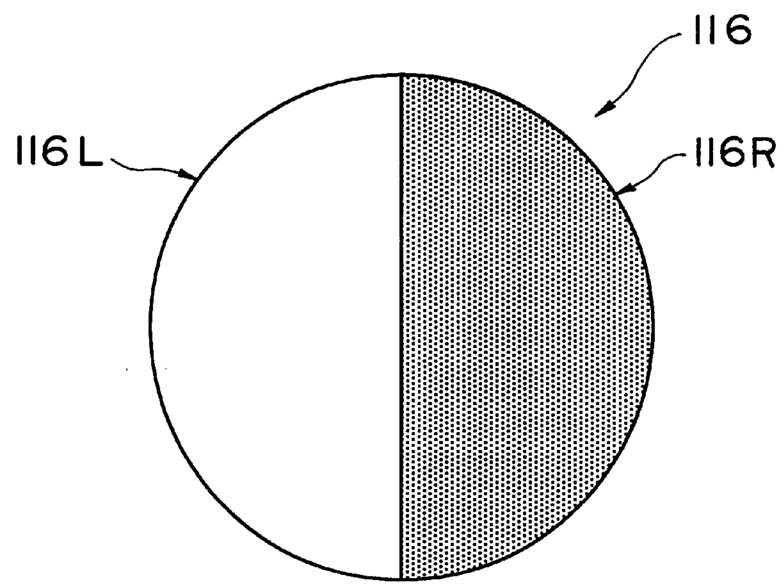
FIG. 32 is an illustration of the state of a spatial optical modulator of the pickup in the playback operation as shown in FIG. 31.
Figure 33:
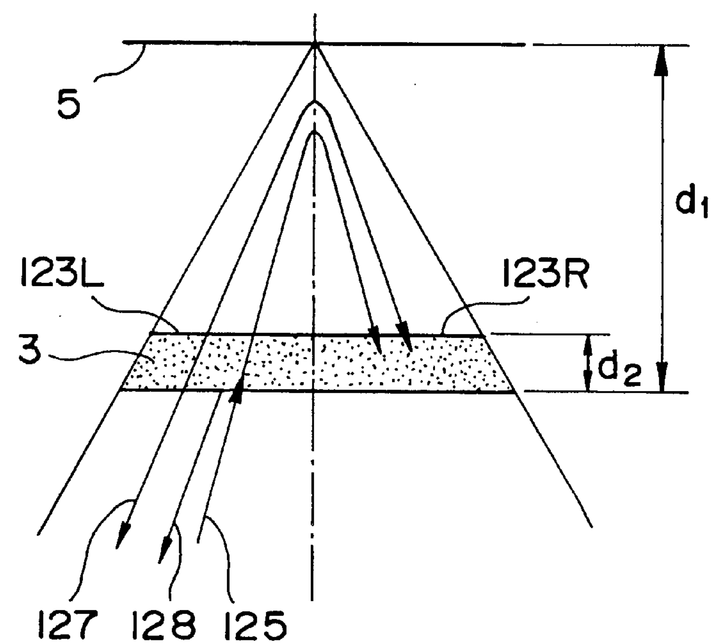
FIG. 33 is an illustration of the states of light beams in the optical information recording medium which is in the playback operation as shown in FIG. 31.

As will be seen from FIG. 32, in the recording operation, all the pixels in the right half region 116R of the spatial optical modulator 116 are set to non-transmissive state, whereas, in the left half region 116L, all the pixels are set to transmissive state. The power of the light from the laser coupler 20 is set to a low level suitable for the playback. The controller 90 expects, based on the basis clocks reproduced from the reproduction signal RF, the time at which the light emitted from the objective lens 12 will pass through the data area 7, and keeps the conditions set forth above during the period in which the light from the objective lens 12 passes through the data area 7. During this period, the focusing servo control and the tracking servo control are kept inoperative so that the objective lens 12 is fixed.

The laser light emitted from the laser coupler 20 is collimated by a collimator lens 19 and the collimated beam impinges upon the beam splitter 117. Half light quantity of the light is reflected by the beam splitter so as to impinge upon the spatial optical modulator 116. The light impinging upon the right half region 116R is interrupted, so that only the light which is incident to the left half region 116L is transmitted through the spatial optical modulator 116 to form playback reference light 125. As can be seen from FIG. 33, the playback reference light 125 is condensed by the objective lens 12 and passes through the holographic layer 3 while converging, so as to minimize its diameter at the reflective film 5. The reference light is then reflected by the reflective film 5 and passes again through the holographic layer 3 while diverging. In the region 123L of the holographic layer 3 through which the converging playback reference light 125 runs, reproduction light 126, which corresponds to the aforesaid information light 121 used for the recording, is generated as a result of the application of the playback reference light 125. The reproduction light 126 thus generated runs towards the objective lens 12 in a diverging manner. In contrast, in the region 123R of the holographic layer 3 through which the diverging playback reference light 125 reflected by the reflective film 5 runs, reproduction light 127, which corresponds to the information light 121 employed in the recording, is generated as a result of application of the playback reference light 125. This reproduction light 127 runs towards the reflective film 5 in a converging manner so as to minimize its diameter at the reflective film 5, and is reflected by the reflective film 5 to run towards the objective lens 12 in a diverging manner. The reproduction light 126 and the reproduction light 127 carry an identical information. These reproduction lights 126, 127 are collimated through the objective lens 12 and the collimated beam is made to be incident to the beam splitter 117 through the left half region 116L of the spatial optical modulator 116. Half light quantity of the beam is transmitted through the beam splitter 117 so as to impinge upon the CCD array 118. The CCD array detects the two-dimensional patterns of the reproduction lights 126, 127, thereby playing back the information. In this embodiment, as shown in FIG. 31, the CCD array 118 needs only to have a size which is large enough to detect the light beam having semi-circular cross-section passed through the left half region 116L of the spatial optical modulator 116.

As will be understood from the foregoing description, the second embodiment offers an advantage in that the costs are saved owing to the simplified construction of the pickup 111. Other structural and operational features, as well as advantages, are substantially the same as those of the first embodiment.

Figure 34:
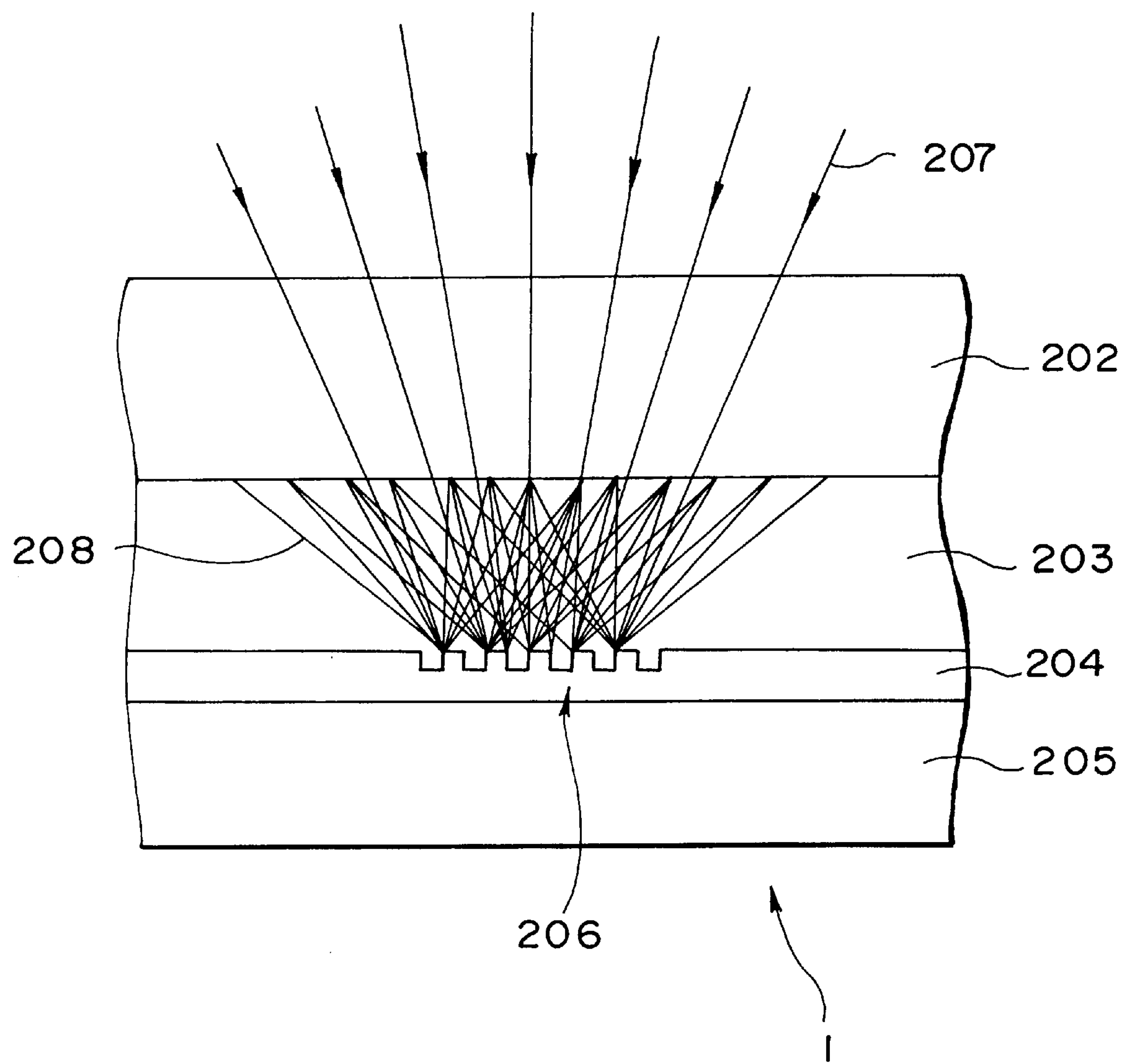
FIG. 34 is an illustration of an optical information recording operation having a reflective diffracting portion.

The optical information recording medium having an information recording layer for recording information by holography may have a construction as shown in FIG. 34. This optical information recording medium 201 has a transparent substrate 202, a holographic layer 203, a reflective film 204 and a transparent substrate 205 which are laminated in the mentioned order. A reflective diffracting portion 206 is formed on the surface of the reflective film 204 adjacent to the holographic layer 203. The reflective diffracting portion 206 is a region in which incident light is diffracted and reflected at an angle different from the incident angle.

When the optical information recording medium 201 shown in FIG. 34 is used, for instance, incident light 207 enters in a converging manner from the same side as the transparent substrate 202. Thus, the incident light 207 passes through the transparent substrate 202 and the holographic layer 203 so as to impinge upon the reflective diffracting portion 206. The incident light 207 is diffracted by the reflective diffracting portion 206 and then reflected by the same at an angle which is different from the angle of incidence. The diffracted and reflected light, denoted by 208, passes again through the holographic layer 203. Consequently, the size of the area through which the reflected light 208 runs in the holographic layer 203 is greater than that of the area through which the incident light 207 is transmitted.

Therefore, by using the reflected light 208 as the information light or the recording reference light, it is possible to obtain a greater size of the information recording area than the case where the optical information recording medium is devoid of such a reflective diffracting portion 206, thus enabling more efficient use of the holographic layer 203.

Figure 35:
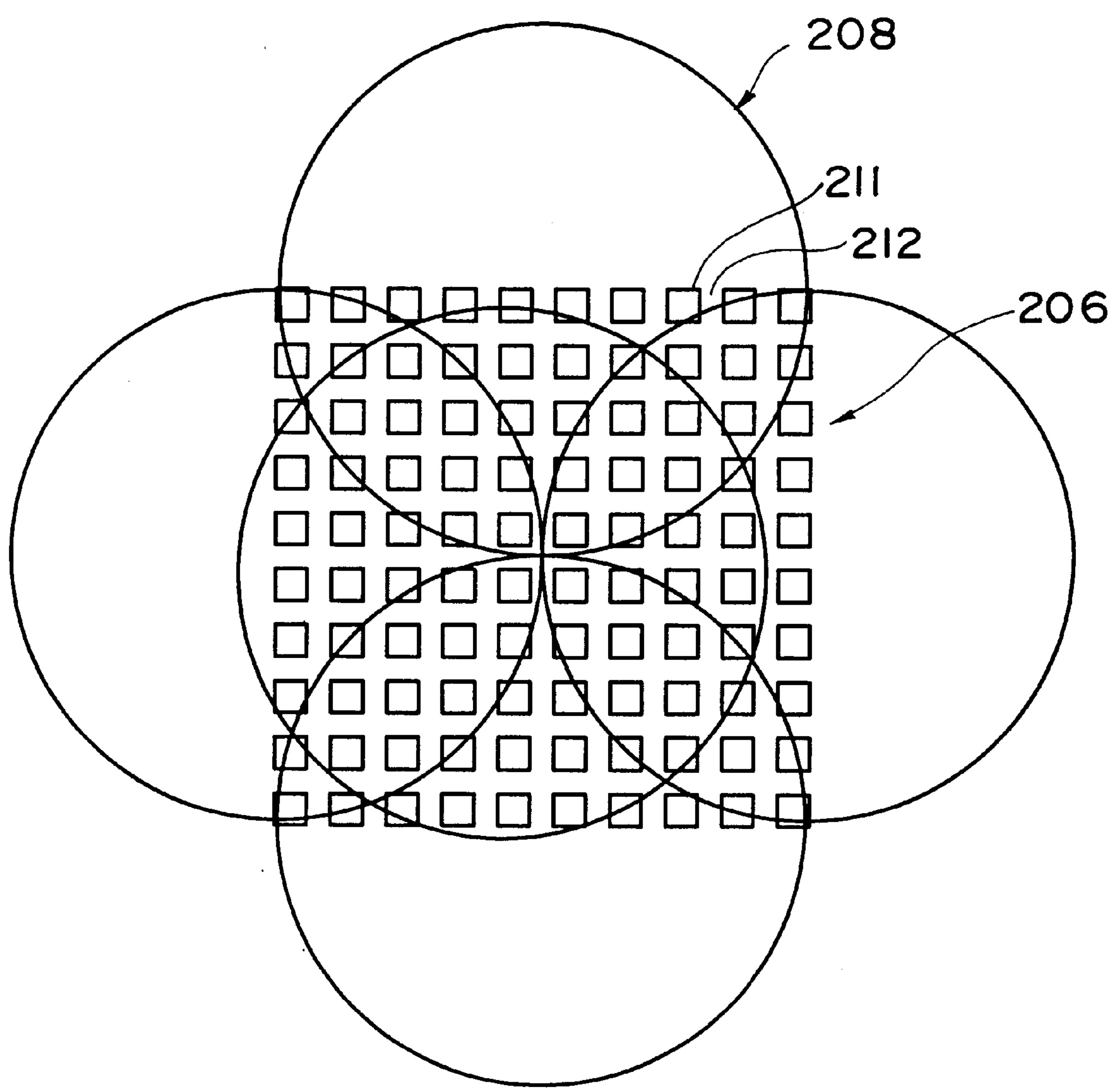
FIG. 35 is an illustration of a method for forming the reflective diffracting portion shown in FIG. 34.
Figure 36:
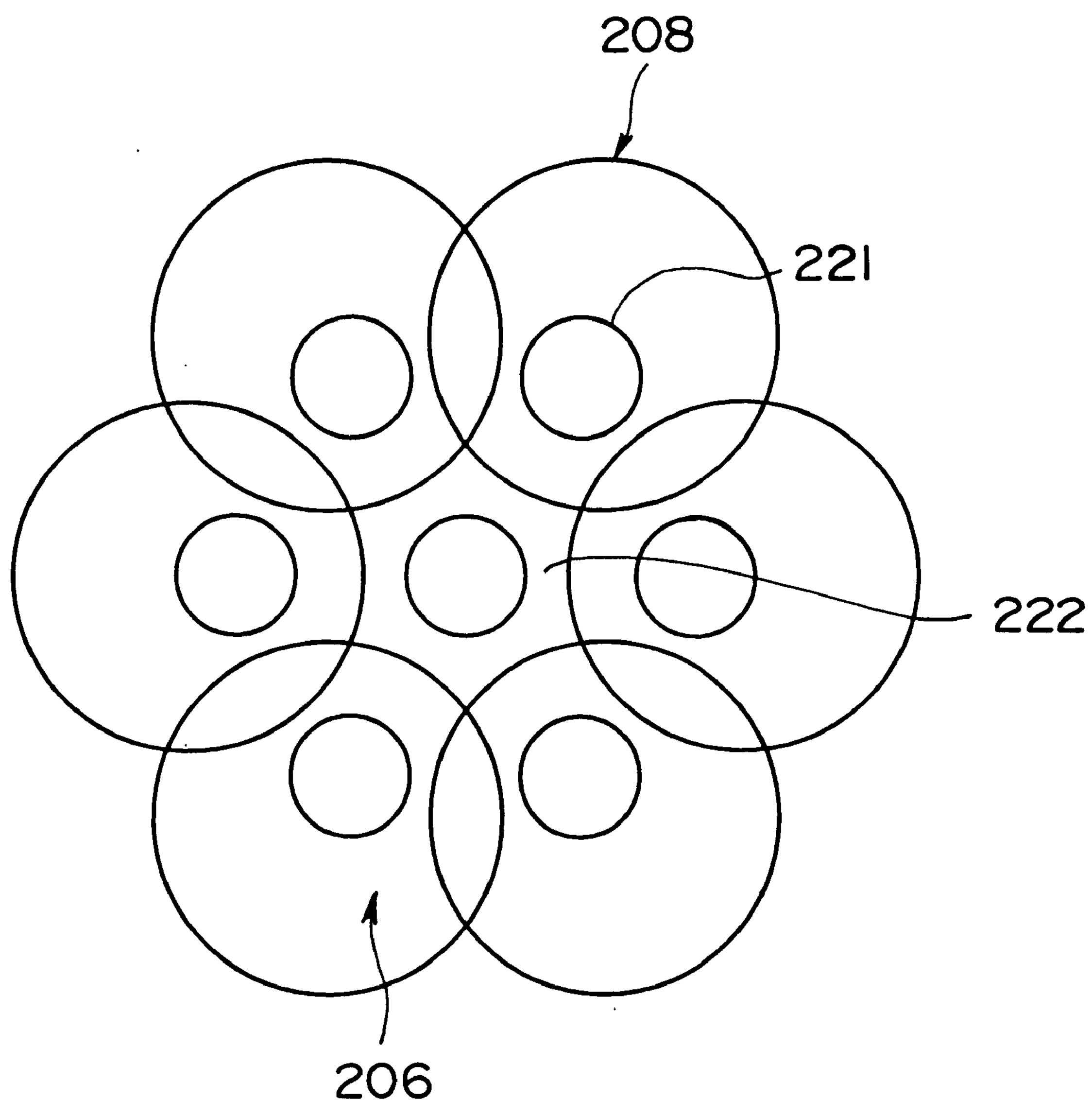
FIG. 36 is an illustration of a different method for forming the reflective diffracting portion shown in FIG. 34.
Figure 37:
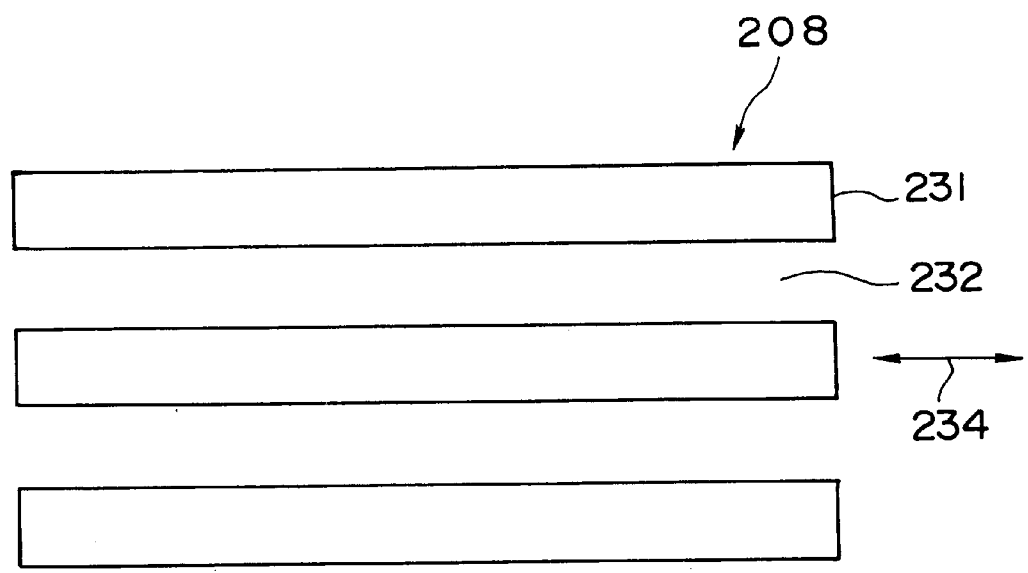
FIG. 37 is an illustration of a different method for forming the reflective diffracting portion shown in FIG. 34.

FIGS. 35 through 37 illustrate different processes for forming the reflective diffracting portion 206. Referring first to FIG. 35, rectangular grooves 211 surrounded by land portions 212 are formed on the reflective film 204, so that these grooves 211 and land portions 212 in cooperation form a reflective diffracting portion 206. This reflective diffracting portion 206, upon receipt of the converging incident light 207 as shown in FIG. 34, diffracts and reflects the light so as to diverge the reflected light 208 in four directions in which the grooves 211 are arrayed, as shown in FIG. 35.

Referring now to FIG. 36, circular grooves 221 surrounded by land portions 222 are formed on the reflective film 204 at apices of an imaginary hexagon, so that these grooves 221 and land portions 222 in cooperation form a reflective diffracting portion 206. This reflective diffracting portion 206, upon receipt of the converging incident light 207 as shown in FIG. 34, diffracts and reflects the light so as to diverge the reflected light 208 in six directions in which the grooves 221 are arranged, as shown in FIG. 36.

Referring now to FIG. 37, elongated rectangular grooves 231 separated and surrounded by land portions 232 are formed on the reflective film 204 so as to extend in the tracking direction 234, so that these grooves 231 and land portions 232 in cooperation form a reflective diffracting portion 206. This reflective diffracting portion 206, upon receipt of the converging incident light 207 as shown in FIG. 34, diffracts and reflects the light so as to diverge the reflected light 208 in directions perpendicular to the tracking directions 234.

Figure 38:
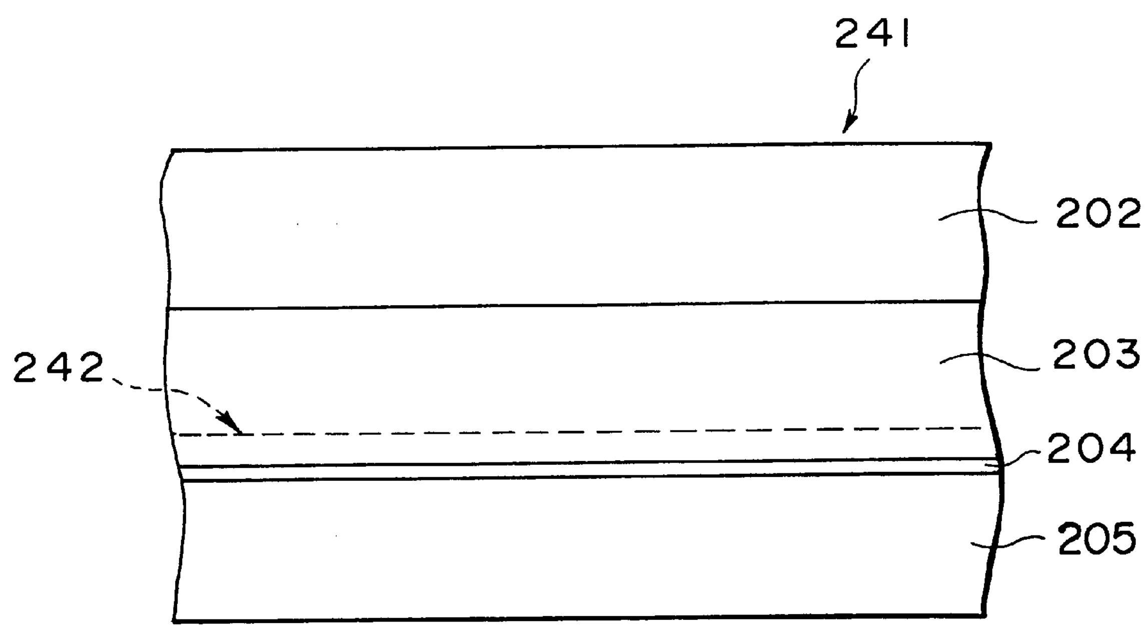
FIG. 38 is an illustration of a different method for forming the reflective diffracting portion shown in FIG. 34.

FIG. 38 shows an optical information recording medium 241 in which, in place of the reflective diffracting portion 206, a reflective diffracting portion 242 is formed in the portion of the holographic layer 203 adjacent to the reflective film 204, by selectively applying high-power laser light to this portion so as to selectively vary the refractive index in this portion. The pattern of this reflective diffracting portion 242 in the optical information recording medium 241 may be the same as any one of those illustrated in FIGS. 34 through 37. The operation of the optical information recording medium 241 is substantially the same as that of the optical information recording medium 201 shown in FIG. 34.

Although the invention has been described through its preferred forms, it is to be understood that these embodiments are only illustrative and various changes and modifications may be imparted thereto. For instance, although in the described embodiments the address information and other information are beforehand recorded in the form of emboss pits in the address servo area 8 of the optical information recording medium, the address information and tracking/servo information for formatting may be recorded in the address servo area 6 at a portion of the holographic layer adjacent to the protective layer 4 by selectively applying high-power laser light to that portion so as to selectively change the refractive index in that portion.

It is also to be noted that the CCD array serving as the device for detecting the information recorded in the information recording layer may be substituted by a suitable other device such as a smart photo-sensor such as that disclosed in a literature "O plus E, September 1996, No. 2, pp 93–99, in which a MOS solid-state imaging device and a signal processing circuit are integrated on a single chip. The smart photo-sensor has a large transfer rate and a high-speed computing function. With this device, therefore, it is possible to perform a high-speed playback, e.g., at a high transfer rate on the order of G bit/sec.

When such a smart photo-sensor is used as the device for detecting the information recorded in the information recording layer, the address information and tracking/focusing information in the address servo area 6, which are recorded in the form of emboss pits in the described embodiment, may be recorded beforehand by the same holographic method as that used for recording information in the data area 7. In such a case, servo control operations may be performed by setting the pickup to the same state as that for the playback operation so that the address information and tracking/focusing information are detected by the smart photo-sensor which is used also for the purpose of playback of the recorded information. In this case, the basic clocks and address are obtained directly from the data detected by the smart photo-sensor, while the tracking error signal can be derived from the reproduced pattern information available on the smart photo-sensor. At the same time, focusing servo control can be performed by driving the objective lens 12 such as to maximize the contrast of the reproduction pattern on the smart photo-sensor. Focusing servo control during the playback operation also can be performed by driving the objective lens 12 such as to maximize the contrast of the reproduction pattern on the smart photo-sensor.

In the first and second embodiments as described, the modulation of light beams in accordance with the information to be recorded is performed by using difference in the direction of polarization, while the third embodiment relies upon modulation by intensity of the light. These modulation techniques also are illustrative and other modulating method such as that using phase difference may be used in the present invention.

What we claim are:

1. An optical information recording apparatus for recording information in an optical information recording medium having an information recording layer which is capable of recording information by means of holography, comprising:

a light source for emitting a light beam which is to be applied to said optical information recording medium;

spatial modulating means for spatially modulating at least part of the light beam from said light source, so as to generate an information light and a recording reference light; and a recording optical system for applying said information light and said recording reference light generated by said spatial modulating means to said information recording layer from the same side of said optical information recording medium, so that the information is recorded in said information recording layer in the form of an interference pattern produced by the interference between said information light and said recording reference light.

2. An optical information recording apparatus according to claim 1, wherein said optical information recording medium has an addressing area storing information for addressing said information light and said reference light, said apparatus further comprising:

position control means for controlling the position of said information light and said recording reference light with respect to said optical information recording medium, based on the information recorded in said addressing area.

3. An optical information recording apparatus according to claim 1, wherein said recording optical system applies said information light and said recording reference light such that they are converged at different thicknesswise direction of said optical information recording medium.

4. An optical information recording apparatus according to claim 3, wherein said spatial modulating means produces spatially modulated light based on the difference in the polarizing direction in accordance with the information to be recorded, thereby generating said information light and said recording reference light having different directions of polarization; and wherein said recording optical system includes:

separating means for separating said information light and said recording reference light generated by said spatial modulating means from each other, by differentiating the converging positions according to the polarizing directions;

light condensing means for condensing and applying said information light and said recording reference light to said optical information recording layer, in such a manner that one of said information light and said recording reference light passes through said information recording layer in a converging manner while the other passes through said information recording layer in a diverging manner after having once converged; and optical rotating means for setting the polarizing directions of said information light and said recording reference light in opposite directions, for each of two halves of cross-section of said light beam so that the polarizing directions of said information light and said recording reference light coincide with each other in the region in said optical information recording layer where said information light and said recording reference light applied by said light condensing means are superposed to each other.

5. An optical information recording apparatus according to claim 1, wherein said optical information recording medium has a reflective surface provided on the side of said information recording layer opposite to the side from which said information light and said recording reference light enters said information recording layer;

wherein said spatial modulating means modulates part of the cross-section of said light beam to form said information light while causing the other part of the cross-section to constitute said recording reference light; and wherein said recording optical system applies said information light and said recording reference light to said information recording layer, such that said information light and said recording reference light are converged at said reflective surface so that interference takes place in said information recording layer between said information light prior to reaching said reflective surface and said recording reference light reflected by said reflective surface, as well as between said recording reference light prior to reaching said reflective surface and said information light reflected by said reflective surface.

6. An optical information playback apparatus for playing back information from an optical information recording medium having an information recording layer in which said information has been recorded by holography, comprising:

a light source for emitting a light beam to be applied to said optical information recording medium;

a playback optical system for generating, from said light beam emitted from said light source, a playback reference light and applying said playback reference light to said information recording layer, said playback optical system also collecting, from the same side of said information recording layer as the side from which said playback reference light is applied, reproduction light which is generated from said information recording layer as a result of the application of said playback reference light; and detecting means for detecting said reproduction light collected by said playback optical system.

7. An optical information playback apparatus according to claim 6, wherein said optical information recording medium has a reflective surface on one side of said information recording layer, said information having been recorded in said information recording layer in terms of an interference pattern caused by an interference between an information light and a recording reference light which have been applied to said information recording layer from the other side thereof such that said information light and said recording reference light converge at different thicknesswise position of said information recording layer; and wherein said playback optical system applies to said information recording layer said playback reference light such that said playback reference light converges at the same thicknesswise position as said recording reference light used in the recording of said information, and collects reproduction light which is generated from said information recording layer as a result of application to said information recording layer of a light which is produced as a result of application of said playback reference light to said information recording layer and then reflected back by said reflective layer.

8. An optical information playback apparatus according to claim 6, wherein said optical information recording medium has an addressing area storing information for addressing said information light and said reference light, said apparatus further comprising:

position control means for controlling the position of said information light and said recording reference light with respect to said optical information recording medium, based on the information recorded in said addressing area.

9. An optical information payback apparatus according to claim 6, wherein said reproduction light is a light which has been spatially modulated in accordance with said information, and said detecting means detects the pattern of said reproduction light.

10. An optical information playback apparatus according to claim 9, wherein said reproduction light includes reference position information indicative of a reference position in said pattern of said reproduction light, said apparatus further comprising: reference position determining means for determining said reference position in said pattern of said reproduction light based on said reference position information detected by said detecting means.

11. An optical information playback apparatus according to claim 6, wherein said playback optical system includes an optical rotating means which changes polarizing direction of two cross-sectional halves of a light beam in different directions so that the two halves of said light beam form reference lights of different polarizing directions, said optical rotating means further changes the polarizing directions of two cross-sectional halves of the reproduction light so that said reproduction light has an identical polarizing direction over its entire cross-section.

12. An optical information playback apparatus according to claim 6, wherein said optical information recording medium has a reflective surface on one side of said information recording layer, and wherein said information has been recorded in said information recording layer by applying, to said information recording layer, an information light constituted by a cross-sectional part of a light beam and a recording reference light constituted by the other cross-sectional part of said light beam such that said information light and said recording reference light converge at said reflective surface so that said information is recorded in terms of interference patterns produced by an interference between said information light prior to reaching said reflective surface and said recording reference light after reflected by said reflective surface and an interference between said recording reference light before reaching said reflective surface and said information light after reflected by said reflective surface, and wherein said playback optical system applies to said information recording layer a playback reference light corresponding to said recording reference light.

13. An optical information recording method for recording information in an optical information recording medium having an information recording layer which is capable of recording information by holography, comprising the steps of:

spatially modulating at least part of a light beam emitted from a light source, so as to generate an information light and a recording reference light; and applying said information light and said recording reference light to said information recording layer from the same side of said information recording layer so that information is recorded in said information recording layer in terms of an interference pattern produced by an interference between said information light and said recording reference light.

14. An optical information playback method for playing back information from an optical information recording medium having an information recording layer in which said information has been recorded by holography, comprising the steps of:

generating a playback reference light from a light beam emitted from a light source and applying said playback reference light to said information recording layer so that a reproduction light is generated from said information recording layer;

collecting said reproduction light from the same side of said information recording layer as the side from which said playback reference light is applied to said information recording layer; and detecting the collected reproduction light.

15. An optical information recording medium, comprising an information recording layer which is capable of holographically recording information in terms of an interference pattern caused by an interference between an information light and a recording reference light which are applied thereto, and capable of generating, when irradiated with a playback reference light, a reproduction light corresponding to the recorded information and emitting said reproduction light from the same side thereof as the side from which said playback reference light is applied.

16. An optical information recording medium according to claim 15, wherein said information is recorded in said information recording layer in terms of the interference pattern caused by the interference between said information light and said recording reference light which are applied from an identical side of said information recording layer.

17. An optical information recording medium according to claim 15, comprising an addressing area storing information for addressing said information light, said recording reference light and said playback reference light.

18. An optical information recording medium according to claim 15, further comprising a reflective layer on one side of said information recording layer, wherein the information is recorded in said information recording layer in terms of an interference pattern caused by the interference between said information light and said recording reference light which are applied to said information recording layer from the other side of said information recording layer so as to converge at different thicknesswise position of said information recording layer.

19. An optical information recording medium according to claim 15, further comprising a reflective surface on one side of said information recording layer, wherein said information light constituted by a cross-sectional part of a light beam and said recording reference light constituted by the other cross-sectional part of said light beam are applied to said information recording layer in such a manner that they converge at said reflective surface so that the information is recorded in terms of an interference pattern produced by an interference between said information light prior to reaching said reflective surface and said recording reference light after reflected by said reflective surface and by an interference between said recording reference light prior to reaching said reflective surface and said information light after reflected by said reflective surface.

* * * * *